(12) United States Patent
Rege et al.

(10) Patent No.: US 10,428,160 B2
(45) Date of Patent: Oct. 1, 2019

(54) COLORIMETRIC HYDROGEL BASED NANOSENSOR FOR DETECTION OF THERAPEUTIC LEVELS OF IONIZING RADIATION

(71) Applicants: ARIZONA BOARD OF REGENTS ON BEHALF OF ARIZONA STATE UNIVERSITY, Scottsdale, AZ (US); BANNER HEALTH—an Arizona nonprofit corporation, Phoenix, AZ (US)

(72) Inventors: Kaushal Rege, Chandler, AZ (US); Karthik Subramaniam Pushpavanam, Tempe, AZ (US); Stephen Sapareto, Apache Junction, AZ (US)

(73) Assignees: ARIZONA BOARD OF REGENTS ON BEHALF OF ARIZONA STATE UNIVERSITY, Scottsdale, AZ (US); BANNER HEALTH—An Arizona Nonprofit Corporation, Phoenix, AZ (US)

( * ) Notice: Subject to any disclaimer, the term of this patent is extended or adjusted under 35 U.S.C. 154(b) by 0 days.

(21) Appl. No.: 15/645,914

(22) Filed: Jul. 10, 2017

(65) Prior Publication Data

US 2018/0066074 A1 Mar. 8, 2018

Related U.S. Application Data

(60) Provisional application No. 62/490,498, filed on Apr. 26, 2017, provisional application No. 62/360,111, filed on Jul. 8, 2016.

(51) Int. Cl.
*C08B 37/00* (2006.01)
*C08J 3/075* (2006.01)
(Continued)

(52) U.S. Cl.
CPC .......... *C08B 37/0039* (2013.01); *C08J 3/075* (2013.01); *C08K 3/08* (2013.01); *C08K 3/30* (2013.01);
(Continued)

(58) Field of Classification Search
CPC ........ C08B 37/0039; C08K 3/08; C08K 3/30; C08K 2003/0831; C08K 2003/3009;
(Continued)

(56) References Cited

U.S. PATENT DOCUMENTS 5,633,584 A * 5/1997 Maryanskl ............. G01R 33/28
324/300
6,602,470 B2 * 8/2003 Siber ...................... G01N 21/77
422/82.09

(Continued)

OTHER PUBLICATIONS

Perez-Juste, et al., "Electric-Field-Directed Growth of Gold Nanorods in Aqueous Surfactant Solutions", Advanced Functional Materials 14(6), 571-579 (2004).
(Continued)

*Primary Examiner* — Christine S. Kim
(74) *Attorney, Agent, or Firm* — Viksnins Harris Padys Malen LLP

(57) ABSTRACT

An apparatus includes a hydrogel including a metallic compound, a surfactant, an acid, agarose and water. The hydrogel is substantially colorless. A radiated hydrogel having a color is formed when the hydrogel receives a low dose of ionizing radiation.

11 Claims, 40 Drawing Sheets

(51) Int. Cl.
    *C08K 3/08*   (2006.01)
    *C08K 3/30*   (2006.01)
    *C08L 5/12*   (2006.01)
    *G01J 3/00*   (2006.01)
    *C01G 7/00*   (2006.01)

(52) U.S. Cl.
    CPC .............. *C08L 5/12* (2013.01); *C01G 7/00* (2013.01); *C08J 2305/12* (2013.01); *C08K 2003/0831* (2013.01); *C08K 2003/3009* (2013.01); *G01J 3/00* (2013.01)

(58) Field of Classification Search
    CPC ......... C08J 3/075; C08J 2305/12; C01G 7/00; G01J 3/00
    See application file for complete search history.

(56) References Cited

U.S. PATENT DOCUMENTS

| | | | |
|---|---|---|---|
| 7,989,781 B2* | 8/2011 | Patel | G01T 1/06 250/474.1 |
| 10,031,241 B2* | 7/2018 | Maeyama | G01T 1/02 |
| 2005/0208290 A1* | 9/2005 | Patel | C09K 11/06 428/323 |
| 2013/0218001 A1* | 8/2013 | Uhlemann | A61B 5/055 600/411 |
| 2017/0212037 A1 | 7/2017 | Rege et al. | |

OTHER PUBLICATIONS

Pushpavanam, et al., "A Colorimetric Plasmonic Nanosensor for Dosimetry of Therapeutic Levels of Ionizing Radiation", ACS Nano 9(12), 11540-11550 (2015).
Pushpavanam, et al., "Detection of Therapeutic Levels of Ionizing Radiation Using Plasmonic Nanosensor Gels", Advanced Functional Materials 27(21), https://doi.org/10.1002/adfm.201606724 (2017).
Pushpavanam, et al., "Molecular and Nanoscale Sensors for Detecting Ionizing Radiation in Radiotherapy", ChemNanoMat 2(5), 385-395 (2016).
Walker, et al., "Generation of polypeptide-templated gold nanoparticles using ionizing radiation", Langmuir 29(32), 10166-10173 (2013).
Abedini, et al., "A review on radiation-induced nucleation and growth of colloidal metallic nanoparticles", Nanoscale Res Lett 8(1), article 474, https://doi.org/10.1186/1556-276X-8-474 (2013).
Ahmed, "Dosimetry and radiation protection", Physics and Engineering of Radiation Detection (Elsevier Science, Publisher), 621-688 (2015).
Akimoto, et al., "Rectal bleeding after hypofractionated radiotherapy for prostate cancer: correlation between clinical and dosimetric parameters and the incidence of grade 2 or worse rectal bleeding", Int J Radiat Oncol Biol Phys 60(4), 1033-1039 (2004).
Alexiev, et al., "Improved catalytic photometric determination of iron(III) in cetylpyridinium premicellar aggregates", Anal Chim Act 295(1-2), 211-219 (1994).
Anandhakumar, et al., "Unusual seedless approach to gold nanoparticle synthesis: application to selective rapid naked eye detection of mercury(II)", Analyst 139(13), 3356-3359 (2014).
Beyer, et al., "Technical evaluation of radiation dose delivered in prostate cancer patients as measured by an implantable MOSFET dosimeter", Int J Radiat Oncol Biol Phys 69(3), 925-935 (2007).
Cui, et al., "Mechanism of surfactant micelle formation", Langmuir 24(19), 10771-10775 (2008).
Del Rio, et al., "Thermodynamics of Micellization of N-Octyltrimethylammonium Bromide in Different Media", Langmuir 11(5), 1511-1514 (1995).
Delwiche, "Mapping the literature of radiation therapy", J Med Libr Assoc 101(2), 120-127 (2013).
Edgar, et al., "Formation of Gold Nanorods by a Stochastic "Popcorn" Mechanism", ACS Nano 6(2), 1116-1125 (2012).
Engstrom, et al., "In vivo dose verification of Imrt treated head and neck cancer patients", Acta Oncol 44(6), 572-578 (2005).
Essers, et al., "In vivo dosimetry during external photon beam radiotherapy", Int J Radiat Oncol Biol Phys 43(2), 245-259 (1999).
Eustis, et al., "Why gold nanoparticles are more precious than pretty gold: Noble metal surface plasmon resonance and its enhancement of the radiative and nonradiative properties of nanocrystals of different shapes", Chem Soc Rev 35(3), 209-217 (2006).
Fowler, "The radiobiology of prostate cancer including new aspects of fractionated radiotherapy", Acta Oncol 44(3), 265-276 (2005).
Grzelczak, et al., "Shape control in gold nanoparticle synthesis", Chem Soc Rev 37(9), 1783-1791 (2008).
Hall, et al., "Clinical Response of Normal Tissues", Radiology for the Radiologist, (Lippincott Williams & Wilkins, Publisher) 327-348 (2006).
Holmberg, "Accident prevention in radiotherapy", Biomed Imaging Intery J 3(2), article e27, doi:10.2349/biij.3.2.e27 (2007).
Hsi, et al., "Image-guided method for TLD-based in vivo rectal dose verification with endorectal balloon in proton therapy for prostate cancer", Med Phys 40(5), article 051715, doi: 10.1118/1.4801901 (2013).
Huang, et al., "Gold Nanoparticles in Cancer Imaging and Therapeutics", Nano LIFE 01(03n4), 289-307 (2010).
Huang, et al., "Inorganic nanoparticles for cancer imaging and therapy", J Control Release 155(3), 344-357 (2011).
Huang, et al., "Laser Welding of Ruptured Intestinal Tissue Using Plasmonic Polypeptide Nanocomposite Solders", ACS Nano 7(4), 2988-2998 (2013).
Huang, et al., "One-pot synthesis of dendritic gold nanostructures in aqueous solutions of quaternary ammonium cationic surfactants: effects of the head group and hydrocarbon chain length", ACS Appl Mater Interfaces 4(9), 4665-4671 (2012).
Jain, et al., "Anisotropic growth of gold nanoparticles using cationic gemini surfactants: effects of structure variations in head and tail groups", J Mater Chem C 2(6), 994-1003 (2013).
Jana, et al., "Wet Chemical Synthesis of High Aspect Ratio Cylindrical Gold Nanorods", J Phys Chem B 105(19), 4065-4076 (2001).
Jordan, "Review of recent advances in radiochromic materials for 3D dosimetry", J Phys Conf Ser 250(1), article 012043, https://doi.org/10.108811742-6596/250/1/012043 (2010).
Khan, et al., "Au(III)-CTAB reduction by ascorbic acid: preparation and characterization of gold nanoparticles", Colloids Surf B Biointerfaces 104,11-17 (2013).
Kotov, et al., "Organization of Layer-by-Layer Assembled Nanocomposites: Functional effects in photonics and biomaterials", Nanoscale Materials (Kluwer, Publisher, L. Liz-Marzan and P. Kamat, Editors), 273-301 (2003).
Kumar, et al., "Characteristics of mobile MOSFET dosimetry system for megavoltage photon beams", J Med Phys 39(3), 142-149 (2014).
Liu, et al., "Preparation of high-stable silver nanoparticle dispersion by using sodium alginate as a stabilizer under gamma radiation", Radiat Phys Chem 78(4), 251-255 (2009).
Mata, et al., "Aggregation behavior of quaternary salt based cationic surfactants", Thermochimica Acta 428(1-2), 147-155 (2004).
Misra, et al., "Gamma radiation induced synthesis of gold nanoparticles in aqueous polyvinyl pyrrolidone solution and its application for hydrogen peroxide estimation", Radiat Phys Chem 81(2), 195-200 (2012).
Nikoobakht, et al., "Preparation and Growth Mechanism of Gold Nanorods (NRs) Using Seed-Mediated Growth Method", Chem Mater 15(10), 1957-1962 (2003).
Pineiro, et al., "Fluorescence emission of pyrene in surfactant solutions", Adv Colloid Interface Sci 215, 1-12 (2015).
Prasana, et al., "Exploiting sensitization windows of opportunity in hyper and hypo-fractionated radiation therapy", J Thorac Dis 6(4), 287-302 (2014).
Ray, et al., "Toxicity and environmental risks of nanomaterials: challenges and future needs", J Environ Sci Health C Environ Carcinog Ecotoxicol Rev 27(1), 1-35 (2009).
Sanguanmith, et al., "On the spur lifetime and its temperature dependence in the low linear energy transfer radiolysis of water", Phys Chem Chem Phys 14(48), 16731-16736 (2012).

(56) References Cited

OTHER PUBLICATIONS

Sau, et al., "Nonspherical noble metal nanoparticles: colloid-chemical synthesis and morphology control", Adv Mater 22(16), 1781-1804 (2010).
Schreiner, et al., "Dosimetry in modern radiation therapy: limitations and needs", J Phys Conf Ser 56, 1-13 (2006).
Science, "News of Science", Science 125(3236), 16-22 (1957).
Smeenk, et al., "Is there a role for endorectal balloons in prostate radiotherapy? A systematic review", Radiother Oncol 95(3), 277-282 (2012).
Urie, et al., "Nanoscale inorganic scaffolds as therapeutics and delivery vehicles", Curr Opin Chem Eng 7, 120-128 (2015).
Vriezema, et al., "Self-Assembled Nanoreactors", Chem Rev 105(4), 1445-1490 (2005).
Williams, "Radiotherapy near misses, incidents and errors: radiotherapy incident at Glasgow", Clin Oncol 19(1), 1-3 (2007).
Xu, et al. "Simple one-step synthesis of gold nanoparticles with controlled size using cationic Gemini surfactants as ligands: Effect of the variations in concentrations and tail lengths", Colloids Surf A 417, 201-210 (2013).
Zeng, et al., "AuI: an alternative and potentially better precursor than AuIII for the synthesis of Au nanostructures", J Mater Chem 20(12), 2290-2301 (2010).
Zhu, et al., "Facile synthesis of gold wavy nanowires and investigation of their growth mechanism", J Am Chem Soc 134(50), 20234-20237 (2012).

\* cited by examiner

A

B (A)

(B)

COLORIMETRIC HYDROGEL BASED NANOSENSOR FOR DETECTION OF THERAPEUTIC LEVELS OF IONIZING RADIATION

CROSS-REFERENCE TO RELATED APPLICATIONS

This application claims priority to U.S. Patent Application No. 62/360,111 that was filed on 8 Jul. 2016 and U.S. Patent Application No. 62/490,498 that was filed on 26 Apr. 2017. The entire content of each of these applications is hereby incorporated herein by reference.

STATEMENT-REGARDING FEDERALLY SPONSORED RESEARCH

This invention was made with government support under NSF-CBET 1403860 awarded by the National Science Foundation. The government has certain rights in the invention.

FIELD

This disclosure relates to nanosensors and more particularly to hydrogel nanosensors for measuring therapeutic levels of ionizing radiation.

BACKGROUND

Radiation therapy is a common primary treatment modality for multiple malignancies, including cancers of the head and neck, breast, lung, prostate, and rectum. Depending on the disease, radiation doses ranging from 20 to 70 Gy are often employed for therapeutic use. Diseased tissue and normal organ radiation sensitivities also vary. In order to maximize disease treatment relative to radiation-induced side-effects, various methods of delivery including hyperfractionation (0.5-1.8 Gy), conventional fractionation (1.8-2.2 Gy), and hypofractionation (3-10 Gy) have been explored. These delivery methods explore different regimes of radiation sensitivity in order to maximize tumor cell killing while optimizing treatment times.

Despite obvious advantages with radiotherapy, there can be significant radiation-induced toxicity in tissues. For example, radiation-induced proctitis can be a significant morbidity for patients undergoing prostate or endometrial cancer treatment. For centrally located lung cancer radiotherapy, the esophagus can be incidentally irradiated during treatments, resulting in esophagitis. In the head and neck, radiation of salivary gland or pharyngeal tumors can induce radiation-induced osteonecrosis. Another concern during radiotherapy is the motion of the patient as well as the natural peristalsis of internal organs. These issues highlight the importance of appropriately dosing the cancerous tumors while sparing the normal tissue in order to prevent significant morbidity that arises from radiation toxicity.

Despite several transformative advances since its inception in the late 19$^{th}$ century, radiation therapy is a complex process aimed at maximizing the dose delivered to the tumor environments while sparing normal tissue of unnecessary radiation. This has led to the development of image-guided and intensity modulated radiation therapy. The process of treatment planning requires initial simulation followed by verification of dose delivery with anthropomorphic phantoms which simulate human tissue with more or less homogeneous, polymeric materials. The accuracy of the planning is measured using either anthropomorphic phantom or 3D dosimeters. During the treatment, actual dose delivery can be verified with a combination of entry, exit or luminal dose measurements. Administered in vivo doses can be measured with diodes (surface or implantable), thermoluminescent detectors (TLDs), or other scintillating detectors. However, these detectors are either invasive, difficult to handle (due to fragility or sensitivity to heat and light), require separate read-out device, or measure surface doses only. TLDs are typically laborious to operate and require repeated calibration while diodes suffer from angular, energy and dose rate dependent responses. Although MOSFETs can overcome some of these limitations, they typically require highly stable power supplies. In addition, these dosimeters require sophisticated and therefore, expensive, fabrication processes in many cases. In light of these drawbacks, there is still a need for the development of robust and simple sensors in order to assist or replace existing dosimeters that can be employed during sessions of fractionated radiotherapy.

Radiotherapy along with chemotherapy are still the widely accepted treatment options for cancerous diseases. Over the past twenty years, radiotherapy has undergone major changes including image guided delivery, intensity-modulated radiation therapy (IMIRT), Stereotactic radiosurgery (SRS) and Stereotactic body radiotherapy (SBRT). Along with advancement of sophisticated radiotherapy techniques, the complexity of such procedures has drastically increased. The complex planning process involves numerous individuals enhancing the probability of human error being committed and leading to disturbing outcomes in patient morbidity. One potential solution to avoid such errors is the use of dosimeters to measure and confirm the radiation dose being delivered. Current dosimeters including semiconductor diodes, MOSFETs and Thermoluminescent dosimeters are 1D dosimeters wherein they do not have the capability of rendering a 2D response. To overcome this disadvantage and register spatial dose information led to the development of polymer gel dosimeters. These gel based dosimeters find application during IMRT and SRS treatments. Despite the advantages which warrant their everyday use, these dosimeters are rarely ever used. The biggest limitation preventing their day to day use is the use of Magnetic resonance imaging (MRI) to read the gels which requires highly skilled professionals to perform day to day measurements. For accurate readouts, longer time scans are required which would proportionally increase the cost. In addition, they require complex synthesis protocols including preparation in a fume hood and evacuation of air to prevent oxygen diffusion into the gel. These limitations of the polymer based gel dosimeters make their use highly unlikely on a frequent basis. Taking these into consideration, there is still a requirement for the development of a simple dosimeter which can render spatial information which can be read easily.

SUMMARY

This disclosure describes lipid-templated formation of colored dispersions of gold nanoparticles from colorless metal salts as a facile, visual and colorimetric indicator of therapeutic levels of ionizing radiation (X-rays), leading to applications in radiation dosimetry. The current nanosensor can detect radiation doses as low as 0.5 Gy, and exhibit a linear response for doses relevant in therapeutic administration of radiation (0.5-2 Gy). Modulating the concentration and chemistry of the templating lipid results in linear response in different dose ranges, indicating the versatility of the current plasmonic nanosensor platform.

This disclosure also describes a hydrogel-based sensor for detection of low doses of ionizing radiation. The sensor works on the principle of a color change which reports for the radiation dose employed. Ionizing radiation induced conversion of colorless salt solutions of univalent gold ions (Au1) to maroon-colored dispersions of plasmonic gold nanoparticles were used as reporters for ionizing radiation. The color change is qualitatively observed by the naked eye and quantitative measurements are made using a UV-Vis spectrophotometer. The ability of this sensor to measure therapeutic levels of radiation, combined with its facile synthesis make it a viable dosimeter during radiotherapy, military and other applications where reporters of low doses of radiation is required.

In summary, the disclosure describes the detection of ionizing radiation through a hydrogel based nanosensor. The hydrogel based sensor changes color upon exposure to ionizing radiation. The intensity of the color varies with the exposed dose and is used to report for the irradiation conditions. Being encapsulated in a hydrogel, makes the sensor render spatial information regarding the points where irradiation has occurred.

BRIEF DESCRIPTION OF THE DRAWINGS

(FIG. 20A) and (FIG. 20C).

(FIG. 21A) 10 mM and 5 Gy, (FIG. 21B) 10 mM and 47 Gy, (FIG. 21C) 4 mM and 5 Gy, (FIG. 21D) 4 mM and 15 Gy, (FIG. 21E) 2 mM and 0.5 Gy, (FIG. 21F) magnified image of highlighted area of E, and (FIG. 21G) 2 mM and 2.5 Gy.

DESCRIPTION

Facile radiation sensors have the potential to transform methods and planning in clinical radiotherapy. Below are described results of studies on a colorimetric, liquid-phase nanosensor that can detect therapeutic levels of ionizing radiation. X-rays, in concert with templating lipid micelles, were employed to induce the formation of colored dispersions of gold nanoparticles from corresponding metal salts, resulting in a easy to use visible indicator of ionizing radiation.

Figures 11A, 11B, 11C, 11D:
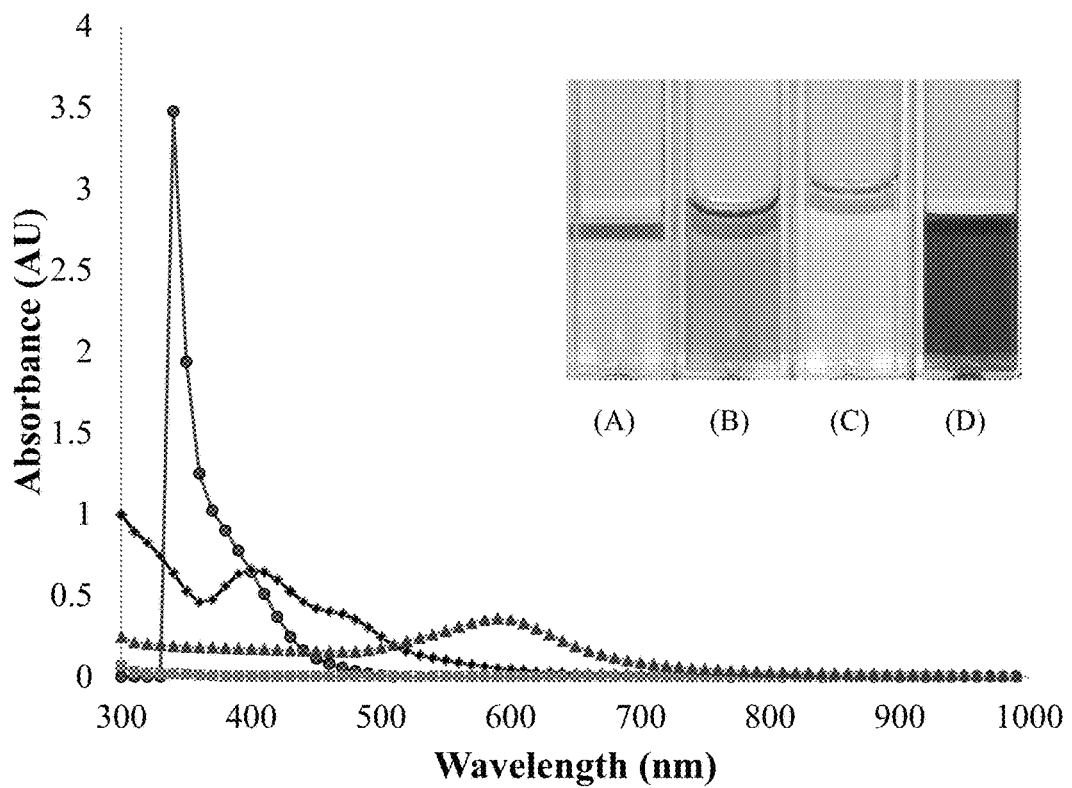
FIGS. 11A-11D show UV-Visible spectral profiles of (FIG. 11A) $HAuCl_4$, (FIG. 11B) $HAuCl_4$ (0.196 mM)+ $C_{16}TAB$ (20 mM), (FIG. 11C) $HAuCl_4$ (0.196 mM)+ $C_{16}TAB$ (20 mM)+Ascorbic Acid (5.88 mM) and (FIG. 11D) $HAuCl_4$ (0.196 mM)+Ascorbic Acid (5.88 mM)AA).

The novel plasmonic nanosensor employs a colorless metal salt solution comprising a mixture of auric chloride ($HAuCl_4$), L-Ascorbic acid (AA) and cetyl ($C_{16}$), dodecyl ($C_{12}$), or octyl ($C_8$) trimethylammonium bromide ($C_x$; $x=16/12/8$ TAB) surfactant molecules (FIG. 1; please see the Experimental Section for more details). In brief, $C_xTAB$ and $HAuCl_4$ were first mixed leading to the formation of $A^{III}Br_4^-$. $HAuCl_4$ shows a prominent peak at 340 nm which shifts to 400 nm after addition of $C_{16}TAB$, likely due to the exchange of a weaker chloride ion by a stronger bromide ion (FIGS. 11A-11B). The shift in absorption peak can also be seen visually as a color change from yellow to orange. Subsequent addition of ascorbic acid turns the solution colorless with no observable peaks between 300 and 999 nm (FIG. 11C). Ascorbic acid reduces Au(III) to Au(I) in a two-electron, step-reduction reaction. It has been shown that addition of up to 5 molar equivalent excess ascorbic acid does not result in the formation of zerovalent gold or Au(0) species, which can be partly attributed to the lower oxidation potential of the acid in presence of $C_{16}TAB$. This mixture of $C_xTAB$, ascorbic acid, and $HAuCl_4$ is employed as the precursor solution for radiation sensing. However, a characteristic peak in the range of 500-600 nm corresponding to gold nanoparticles is observed if ascorbic acid directly reacts with the gold salt in the absence of $C_{16}TAB$ (FIG. 11D), indicating spontaneous formation of nanoparticles in absence of the surfactant under the conditions employed.

First, attempts were made to convert trivalent gold to its univalent state, since the reduction of Au(I) to Au(0) is thermodynamically favored over the reduction of Au(III) to Au(0), due to a higher standard reduction potential of the former. Au(I) has an electronic configuration of $4f^{14}5d^{10}$, and requires a single electron for conversion (reduction) to Au(0). This formation of zerovalent gold or Au(0) is a prerequisite step for nanoparticle formation. In the current plasmonic nanosensor, the electron transfer required for converting Au(I) to Au(0) is facilitated by splitting water into free radicals following exposure to ionizing radiation (X-rays). Water splitting by ionizing radiation generates three key free radicals, two of which, $e^-$ and H., are reducing, and the other(OH.) oxidizing in nature. Excess ascorbic acid is an antioxidant capable of removing the detrimental (oxidizing) OH. radicals generated in the system. $C_xTAB$ surfactants were employed due for their ability to template gold nanoparticles. These three species, namely ascorbic acid, $C_xTAB$, and gold salt, form the key constituents of the current plasmonic nanosensor for ionizing radiation.

Figures 12A, 12B:
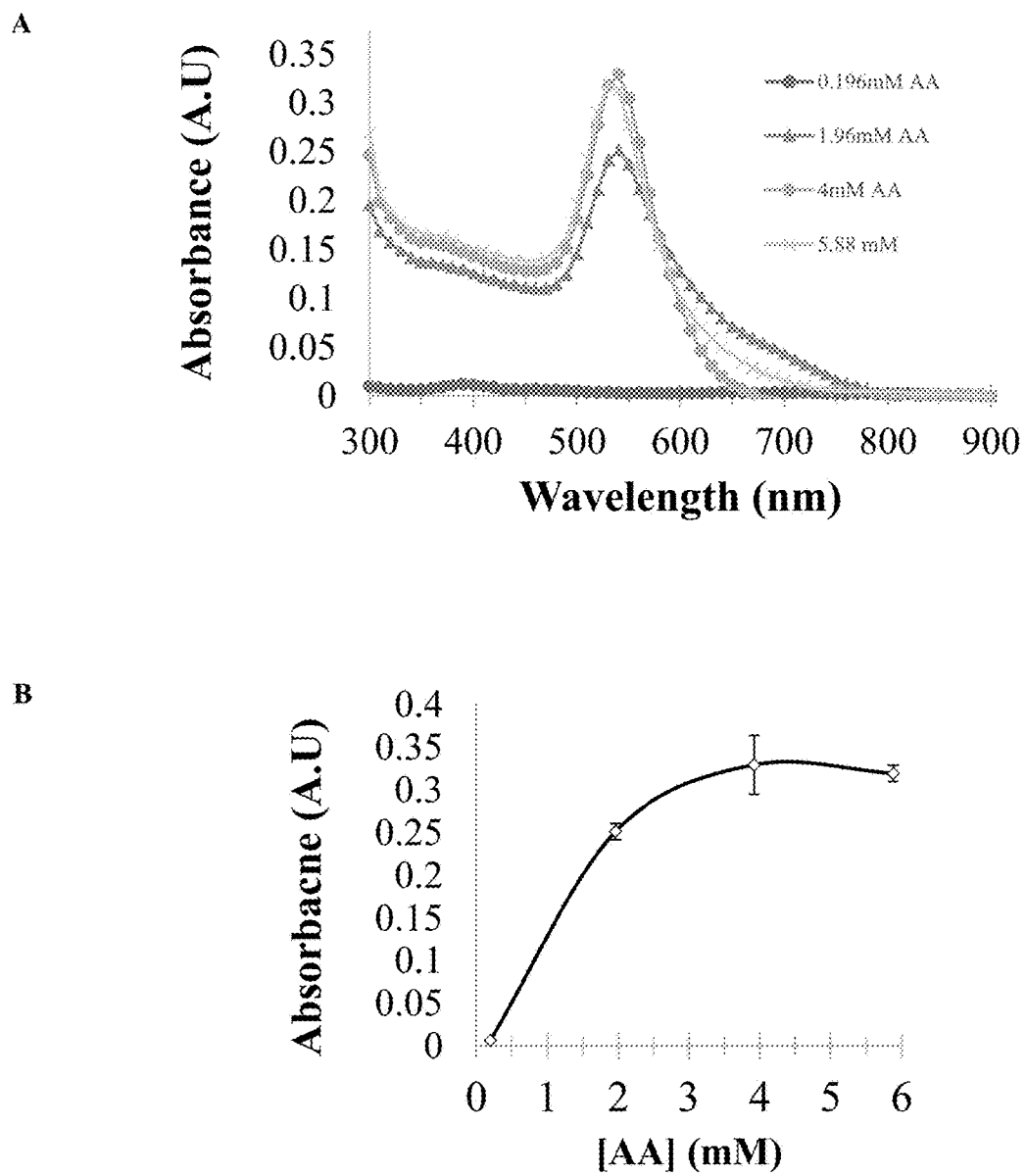
FIGS. 12A-12B show (FIG. 12A) UV-Vis spectra of varying ascorbic acid volumes along with gold and $C_{16}TAB$ irradiated at 47 Gy including a significant increase in the absorbance peak intensity is observed at ~520 nm when the amount of ascorbic acid is increased, indicating an increase in the formation of gold nanoparticles and (FIG. 12B) maximum absorbance values of samples containing varying concentrations of ascorbic acid denoted as [AA].
Figure 13A:
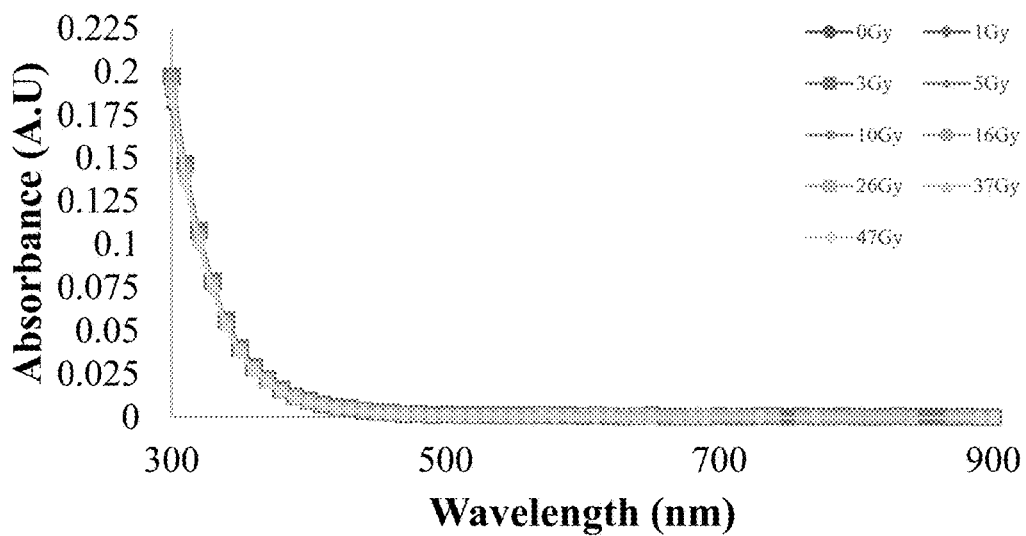
FIGS. 13A-13C show absorbance spectra of (FIG. 13A) gold salt (0.196 mM) (FIG. 13B) gold salt (0.196 mM)+ $C_{16}TAB$ (20 mM) (FIG. 13C) gold salt (0.196 mM)+ $C_{12}TAB$ (20 mM).
Figure 13B:
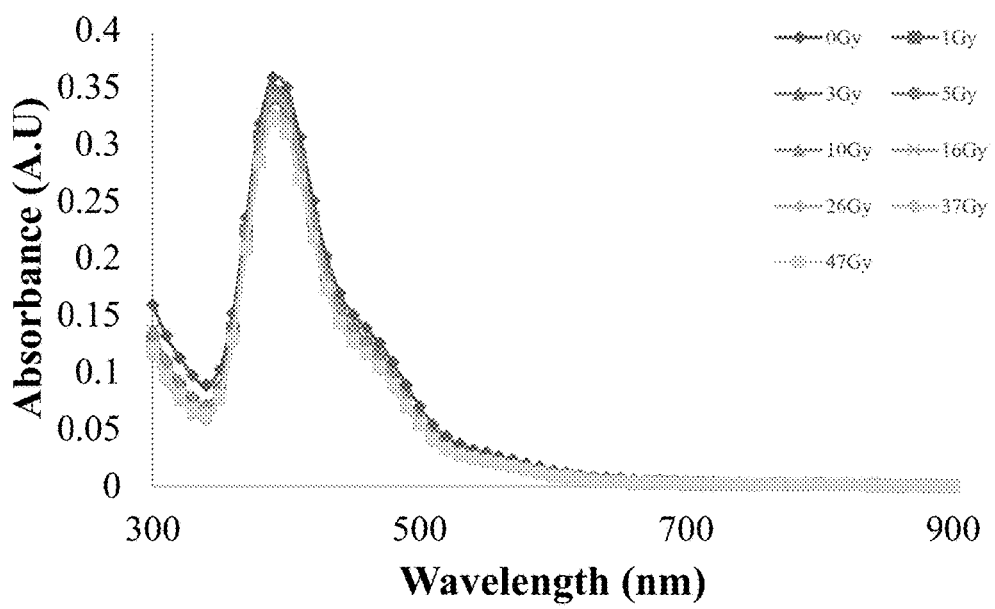
Figure 13C:
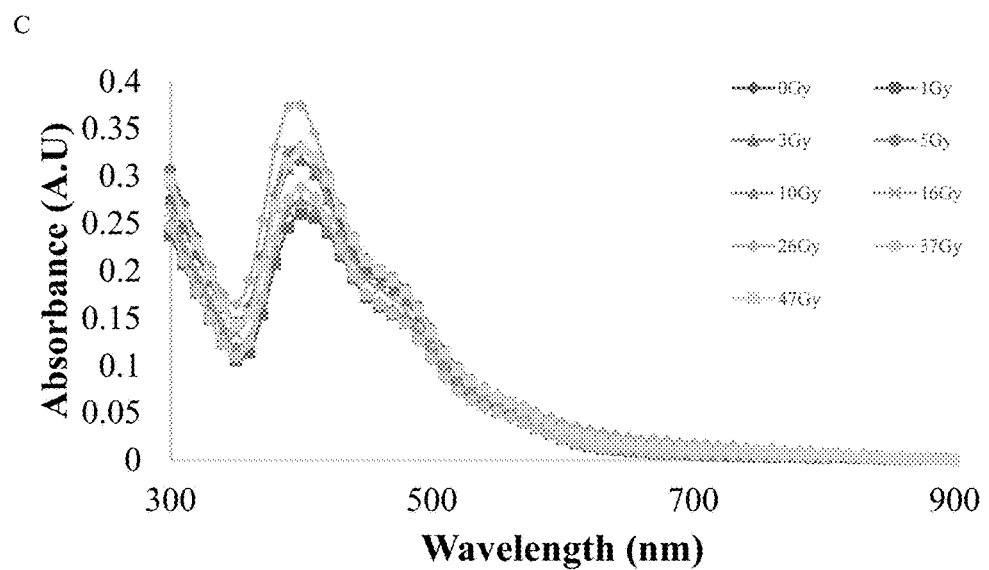

First, the concentration of ascorbic acid (AA) was optimized in the presence of the surfactant ($C_{16}TAB$) and gold salt employed in the plasmonic nanosensor; the maximal dose of 47 Gy was delivered in order to study the effect of ascorbic acid on nanoparticle formation (FIGS. 12A-12B). A marked increase in nanoparticle formation is observed when excess AA is used and it reaches saturation when 600 µL of 0.01 M (4 mM AA) is employed; similar levels of nanoparticle formation are seen when 900 µL of 0.01 M (5.88 mM AA) are employed. Although saturation was observed when 600 µL of AA were used, 5.88 mM AA was used for all subsequent experiments in order to ensure adequate quenching of the detrimental OH. radicals which otherwise adversely affects the yield of nanoparticles generated. Control experiments with (1) gold salt ($HAuCl_4$) alone, (2) gold salt+$C_{16}TAB$ and (3) gold salt+$C_{12}TAB$ were also carried out in presence of different X-ray doses, but in absence of ascorbic acid. Absorbance profiles of the samples were measured after 7 hours and the absence of peaks from 500-900 nm indicated the absence of plasmonic (gold) nanoparticles (FIGS. 13A-13C).

Figures 2A, 2B:
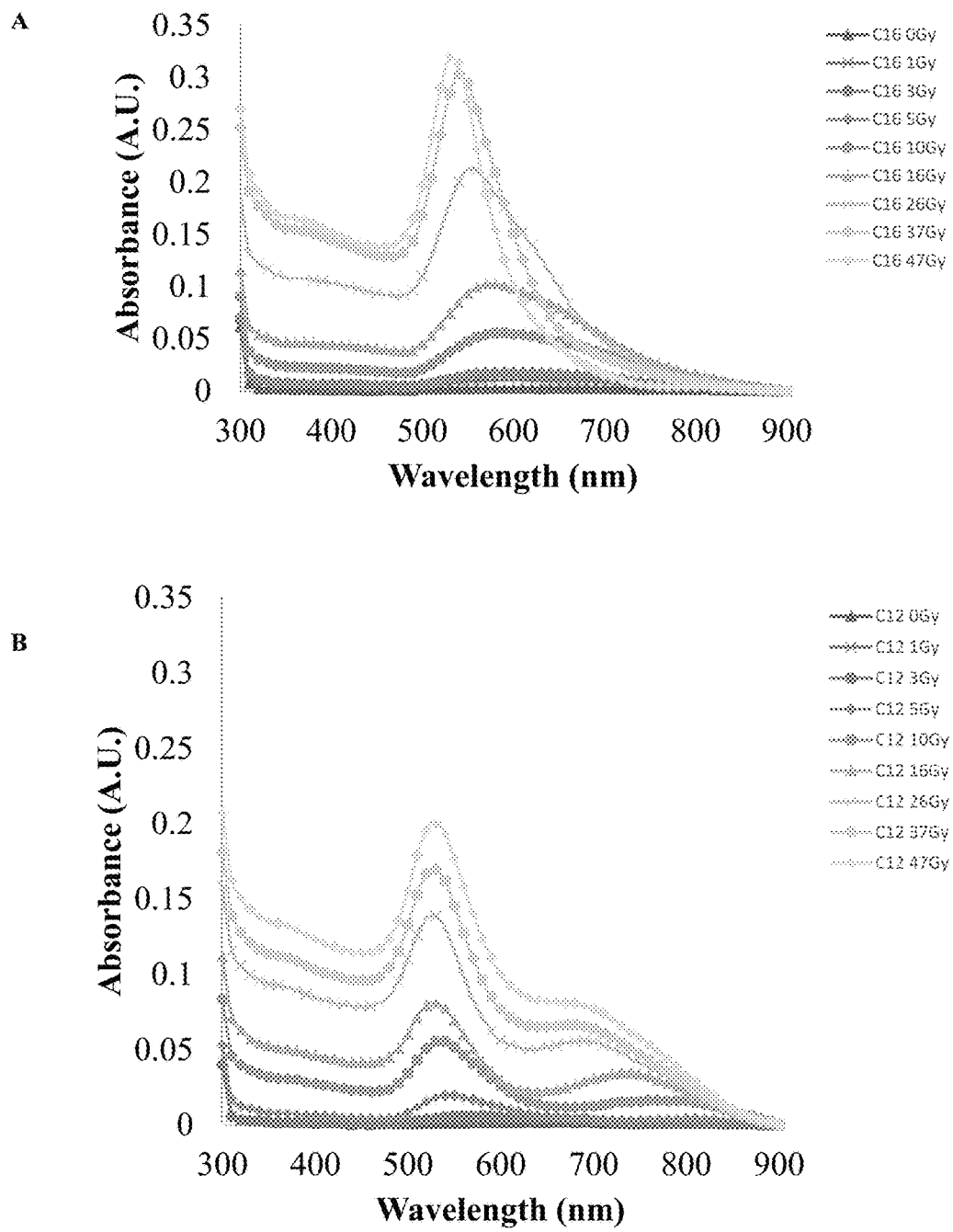
FIGS. 2A-2C show a UV-Vis absorption spectra of the control (0 Gy), irradiated samples containing (FIG. 2A) $C_{16}TAB$, (FIG. 2B) $C_{12}TAB$ and (FIG. 2C) $C_{8}TAB$ after 7 hours.
Figure 2C:
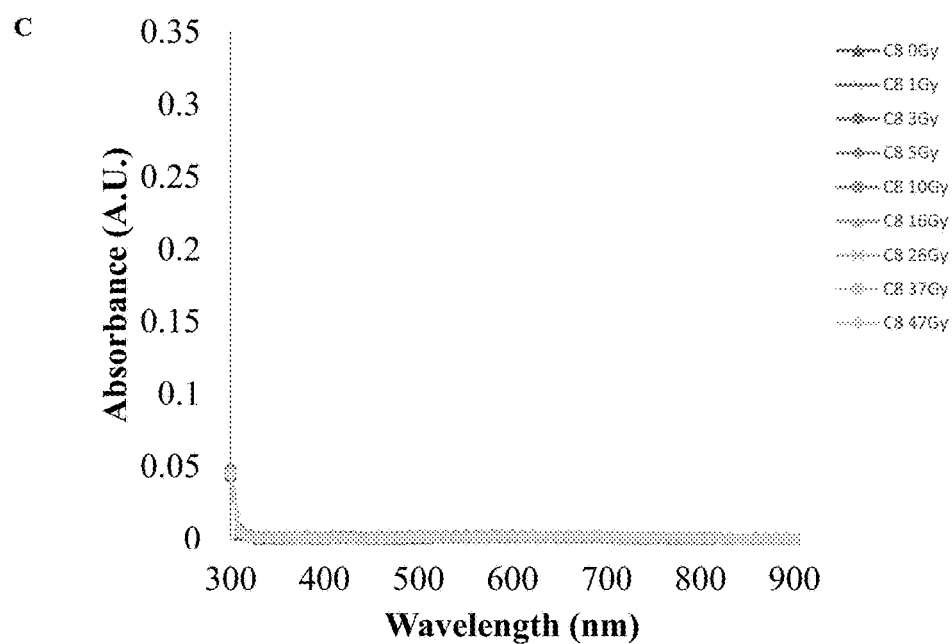

Next, the efficacy of three cationic surfactants, $C_8TAB$ $C_{12}TAB$, and $C_{16}TAB$ was investigated, for inducing nanoparticle formation in presence of different doses of ionizing radiation (FIGS. 2A-2C). All three surfactants have trimethyl ammonium moieties as the head group and bromide as the counter ions; only the lipid chain length was varied as $C_8$, $C_{12}$, and $C_{16}$ in these molecules. As stated previously, a large number of $e^-_{aq}$ and H. radicals are generated following exposure of the solution to X-rays which facilitate the conversion of $Au^+$ ions to their zerovalent $Au^0$ state. The $Au^0$ species act as seeds upon which further nucleation and coalescence occurs. This, in turn, leads to an increase in size and eventual formation of nanoparticles, which are stabilized by surfactant molecules. Formation of these plasmonic nanoparticles imparts a burgundy/maroon color to the dispersion; the intensity of the color increases with an increase in radiation dose applied (FIGS. 3A-3E).

Figure 14A:
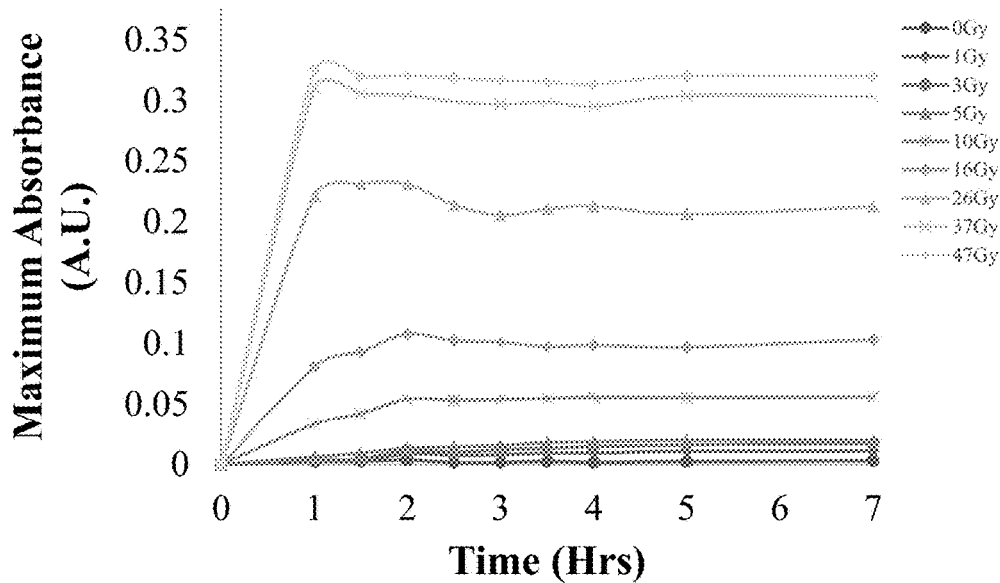
FIGS. 14A-14C show kinetics of gold nanoparticle formation following exposure to different doses of ionizing radiation (0-47 Gy) for (FIG. 14A) $C_{16}TAB$, (FIG. 14B) $C_{12}TAB$ and (FIG. 14C) $C_{8}TAB$.
Figure 14B:
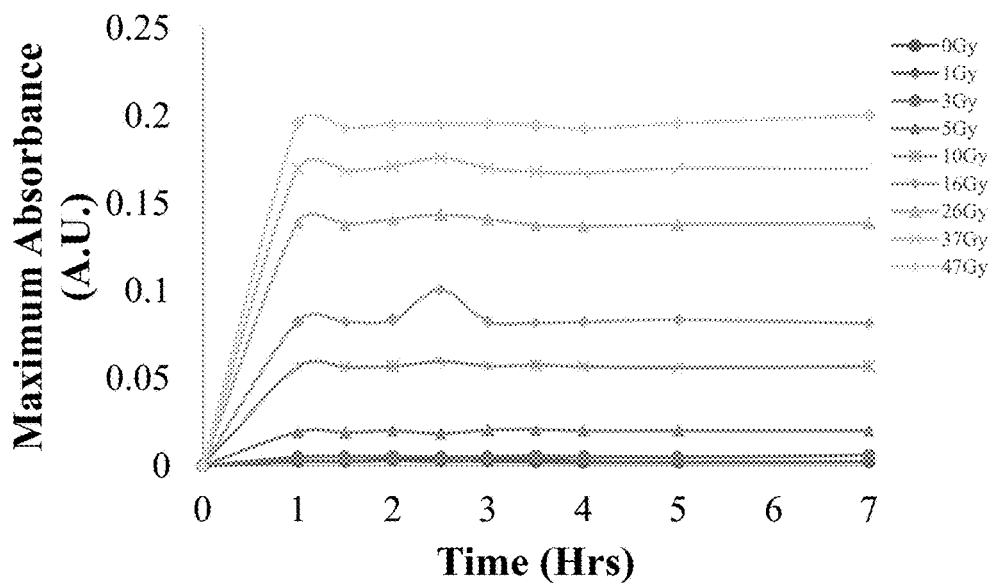
Figure 14C:
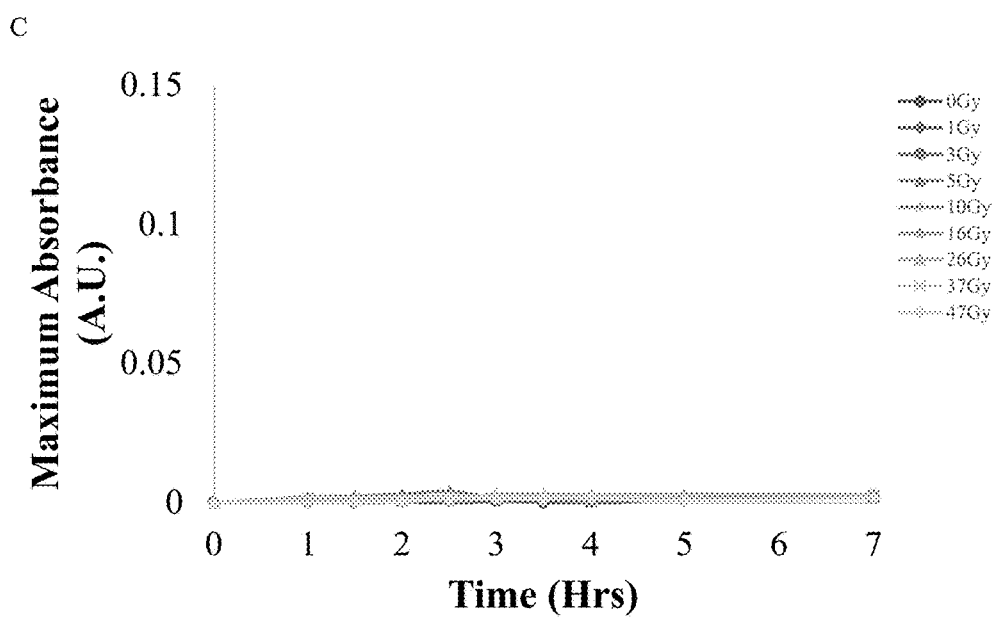
Figure 15:
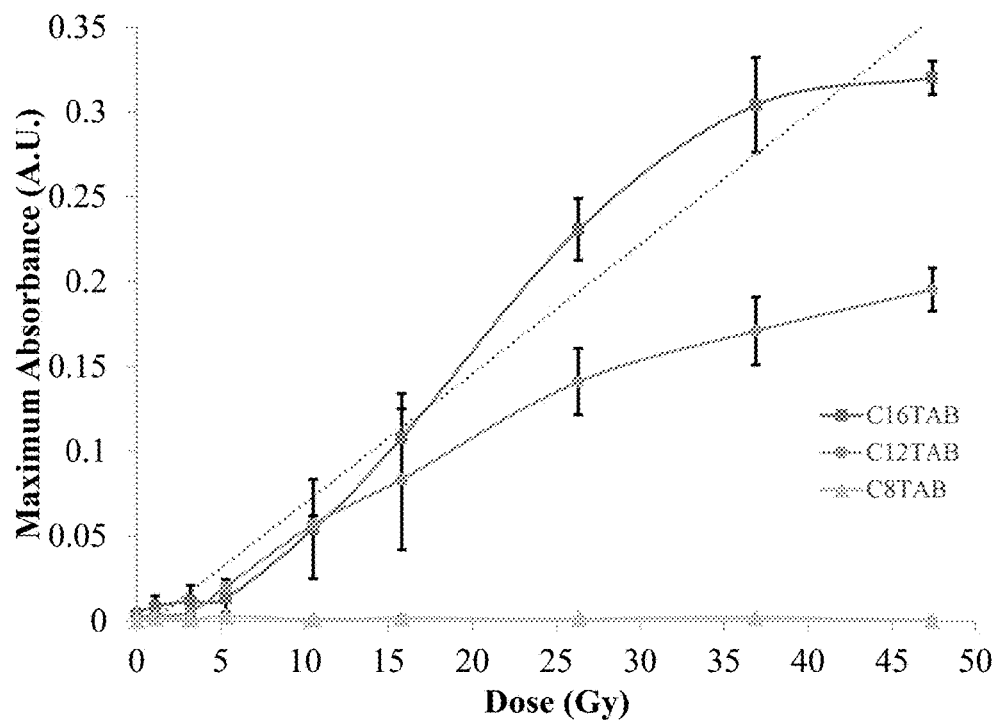
FIG. 15 shows maximum absorbance vs. radiation dose (Gy) after 2 hours of X-ray irradiation with $C_{16}TAB$ (filled squares, solid line) and $C_{12}TAB$ (open circles, dotted line) surfactants.

Nanoparticle formation was seen as early as 1 h following irradiation in many cases, although 2 h were required for samples irradiated with lower doses (1, 3 and 5 Gy) (FIGS. 14A-14C). No significant differences in absorbance intensity were observed thereafter until a period of 7 hours, which was the maximum duration investigated in these cases. Nanoparticle formation was observed at radiation doses as low as 1 Gy, which is well within the range of doses employed for radiotherapy. While $C_{16}TAB$ or $C_{12}TAB$ were effective at templating nanoparticle formation even at low doses (1-5 Gy), $C_8TAB$ did not show any propensity for templating nanoparticle formation even at the highest radiation dose (47 Gy) employed. $C_{12}TAB$-templated gold nanoparticles exhibited unique spectral profiles under ionizing radiation; two spectral peaks —one between 500 and 550 nm and another between 650 and 800 nm—were seen (FIG. 2B). This is in contrast to $C_{16}TAB$ which exhibited only a single peak between 500 and 600 nm (FIG. 2A). Finally, the linear response for $C_{16}TAB$ was significantly more pronounced than that for $C_{12}TAB$ (FIG. 15).

Figure 16:
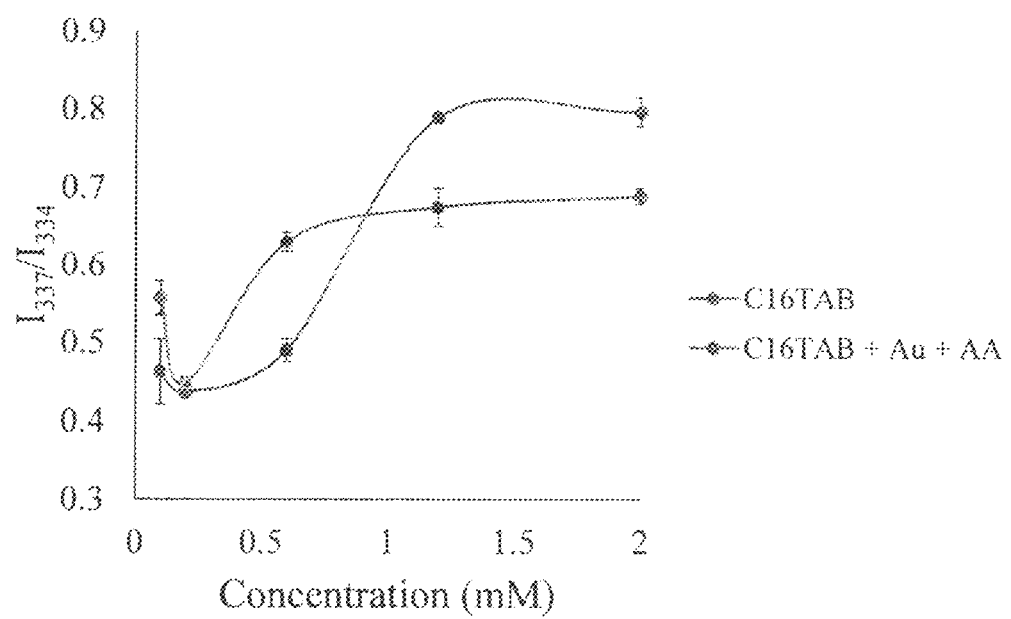
FIG. 16 shows intensity ratio of I337/I334 as a function of surfactant concentration as used to determine the critical micellar concentration.

The critical micelle concentration (CMC) of $C_{16}TAB$ is reported to be approximately 1 mM. Using the pyrene fluorescence assay, we determined the CMC of $C_{16}TAB$ in the nanosensor precursor solution (i.e. gold salt and ascorbic acid in water) to be ~0.7±0.1 mM, which is slightly lower than ~1.2±0.02 mM in THIS solvent (FIG. 16). Pre-micellar aggregates are thought to exist when $C_{16}TAB$ concentration is lower than 7.4 mM, while stable micelles are observed at higher concentrations of the lipid surfactant. One hypothesis is that increasing the ratio of the metallic species ($Au^+$) to the aggregate (pre-micellar/micellar) $C_{16}TAB$ species would lead to greater propensity for nanoparticle formation upon exposure to ionizing radiation and therefore increased sensitivity of the resulting nanosensor at lower radiation doses. Based on the hypothesis that the number of aggregate species increases with lipid concentration, lower concentrations of $C_{16}TAB$ (2 mM, 4 mM and 10 mM) was investigated, while keeping the gold and ascorbic acid concentration constant.

Figure 3A:
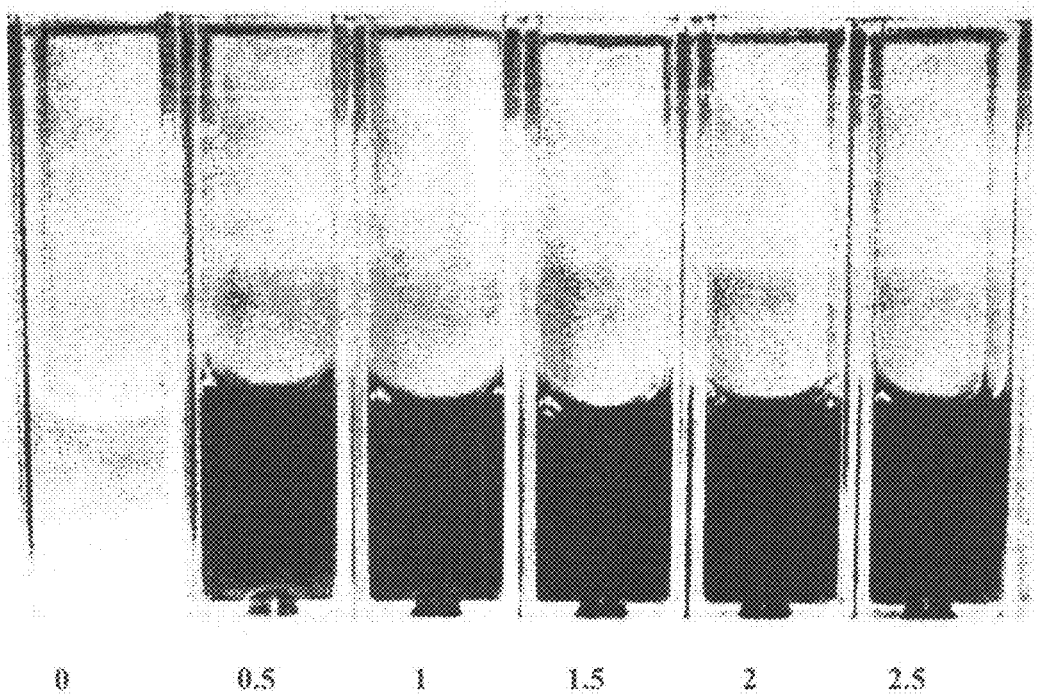
FIGS. 3A-3E show optical images of samples containing different $C_{16}TAB$ and $C_{12}TAB$ concentrations irradiated with a range of X-ray doses (Gy) (FIG. 3A) 2 mM $C_{16}TAB$, (FIG. 3B) 4 mM $C_{16}TAB$, (FIG. 3C) 10 mM $C_{16}TAB$, (FIG. 3D) 20 mM $C_{16}TAB$ and (FIG. 3E) 20 mM $C_{12}TAB$ 2 hours post irradiation.
Figure 3B:
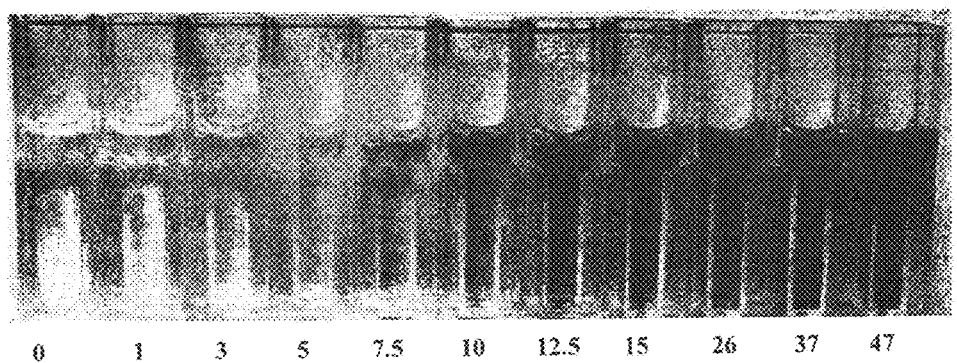
Figure 3C:
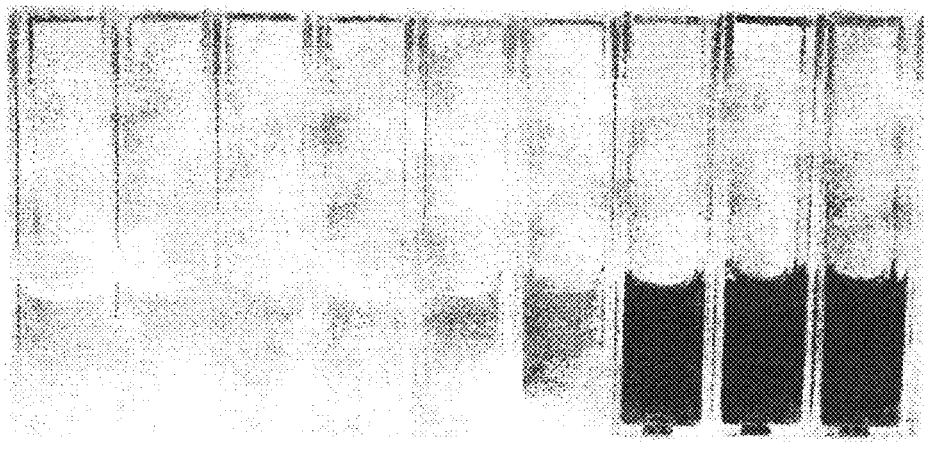
Figure 3D:
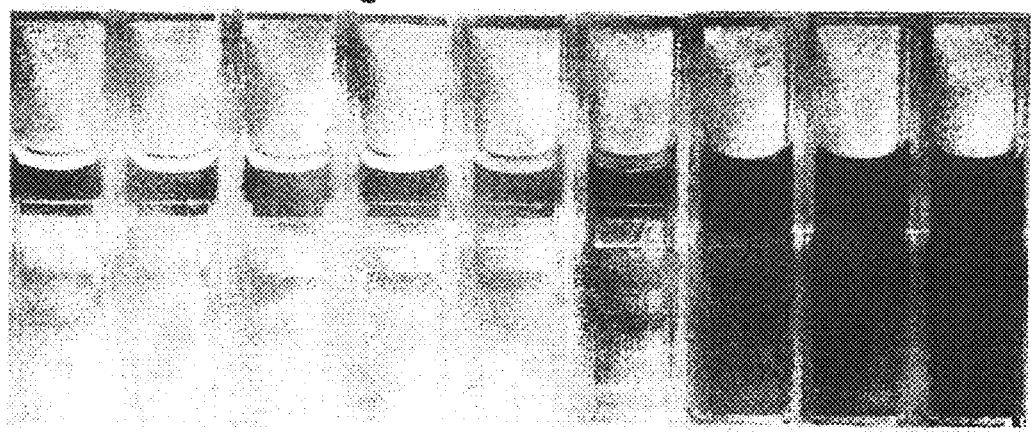
Figure 3E:
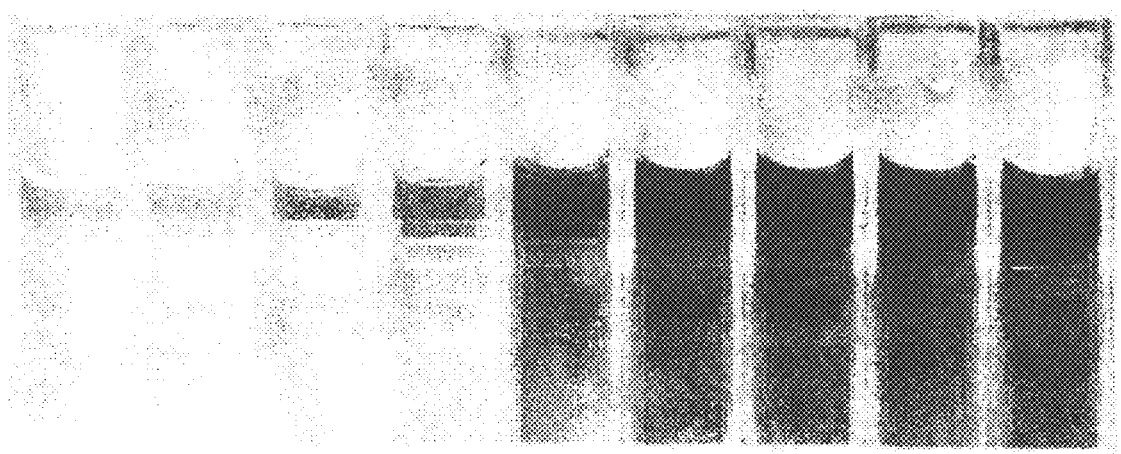
Figure 4:
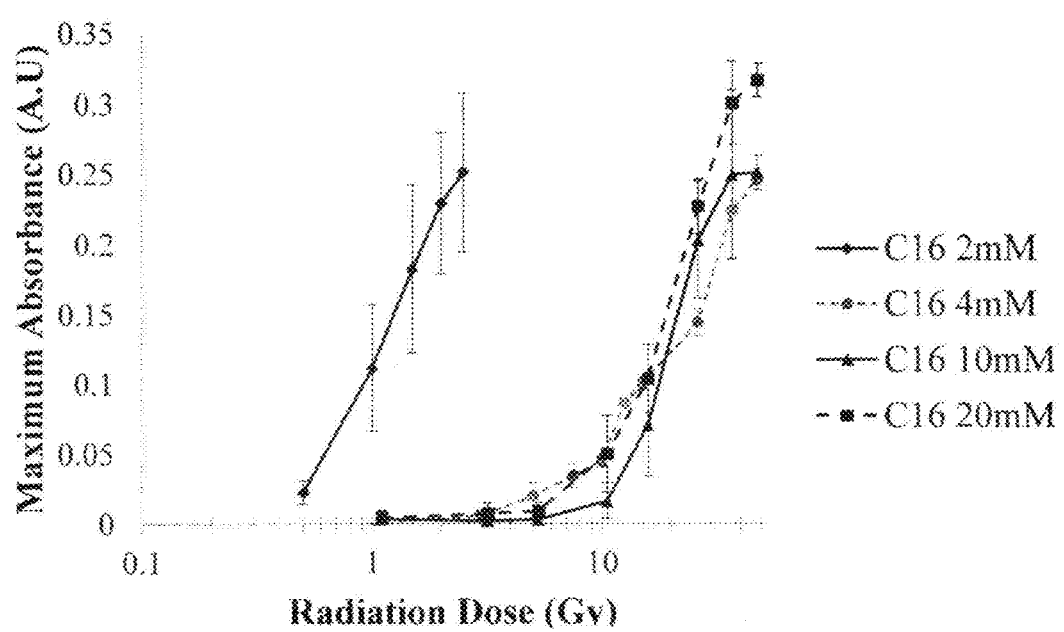
FIG. 4 shows a graph of maximum absorbance vs. radiation dose for varying concentrations of $C_{16}TAB$ after 2 hours post irradiation—filled diamonds, solid line: 2 mM $C_{16}TAB$, filled circles, dashed line: 4 mM $C_{16}TAB$, filled triangles, solid line: 10 mM $C_{16}TAB$, and filled squares, solid line: 20 mM $C_{16}TAB$.
Figure 17A:
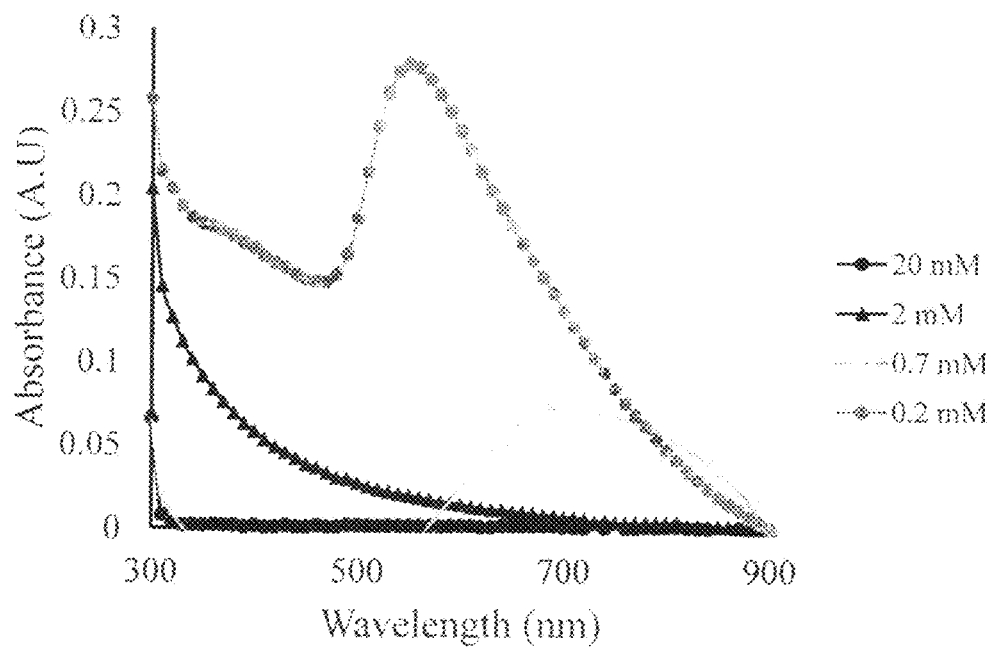
FIGS. 17A-17C show absorbance spectra of precursor monovalent gold salt solutions under conditions of no radiation (i.e. 0 Gy) in presence of different concentrations of (FIG. 17A) $C_{16}TAB$ and (FIG. 17B) $C_{12}TAB$ and (FIG. 17C) $C_{8}TAB$ recorded after 10 minutes of incubation.
Figure 17B:
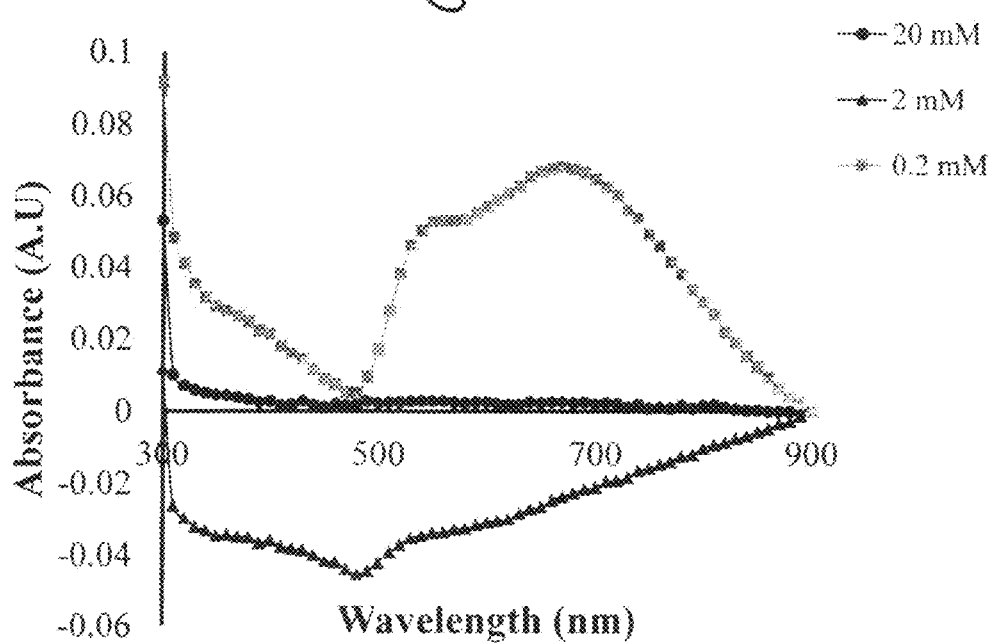
Figure 17C:
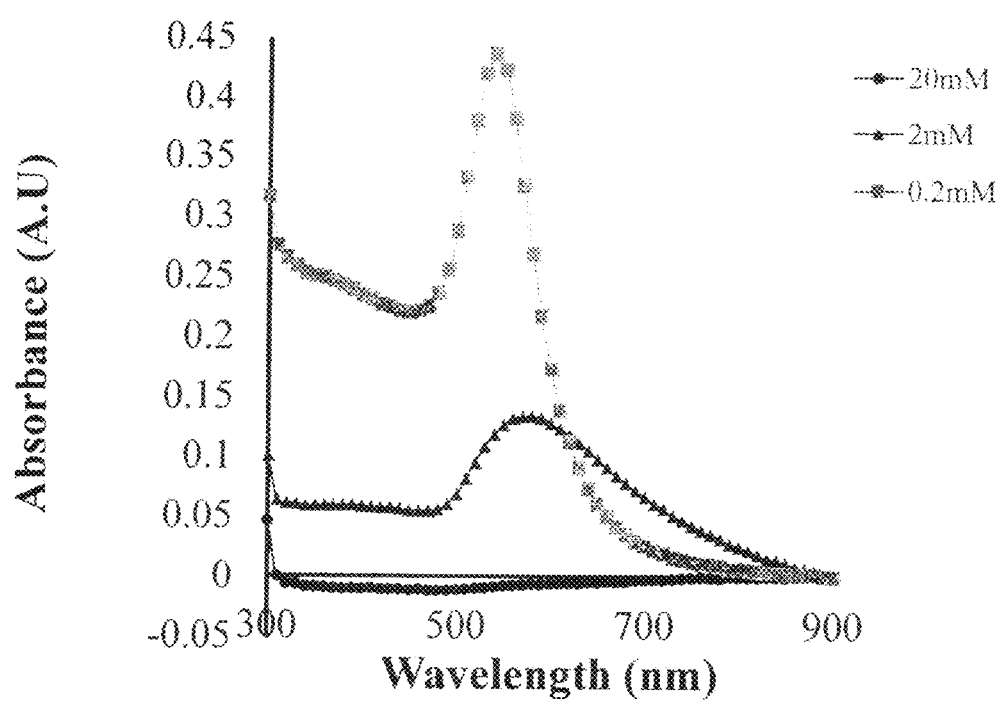
Figure 18A:
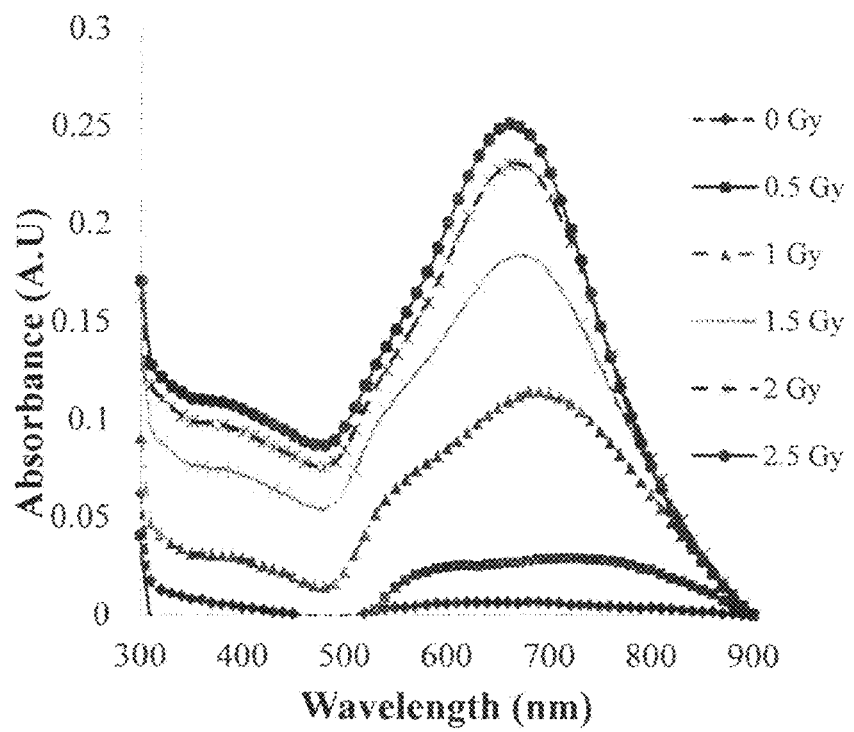
FIGS. 18A-18D show Maximum Absorbance vs. Wavelength for different concentrations of $C_{16}TAB$ after a duration of 2 hours post irradiation (FIG. 18A) 2 mM (FIG. 18B) 4 mM (FIG. 18C) 10 mM (FIG. 18D) 20 mM.
Figure 18B:
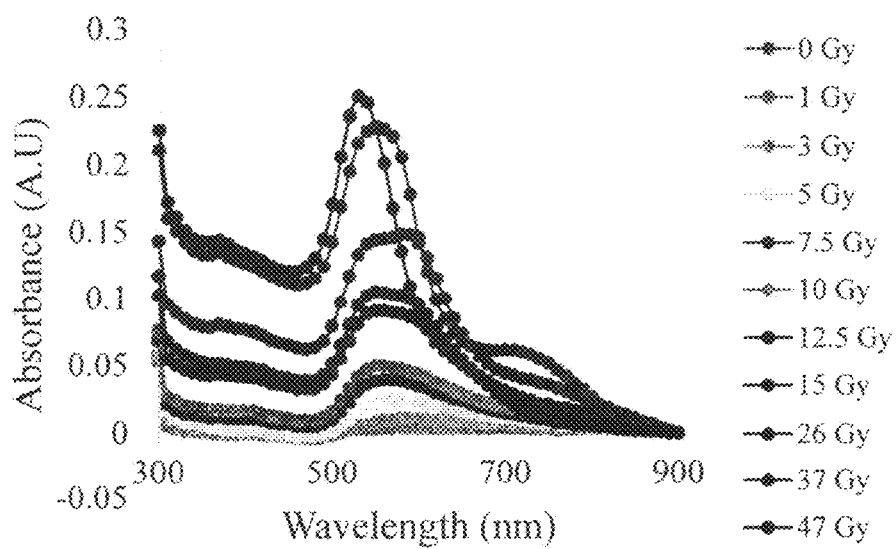
Figure 18C:
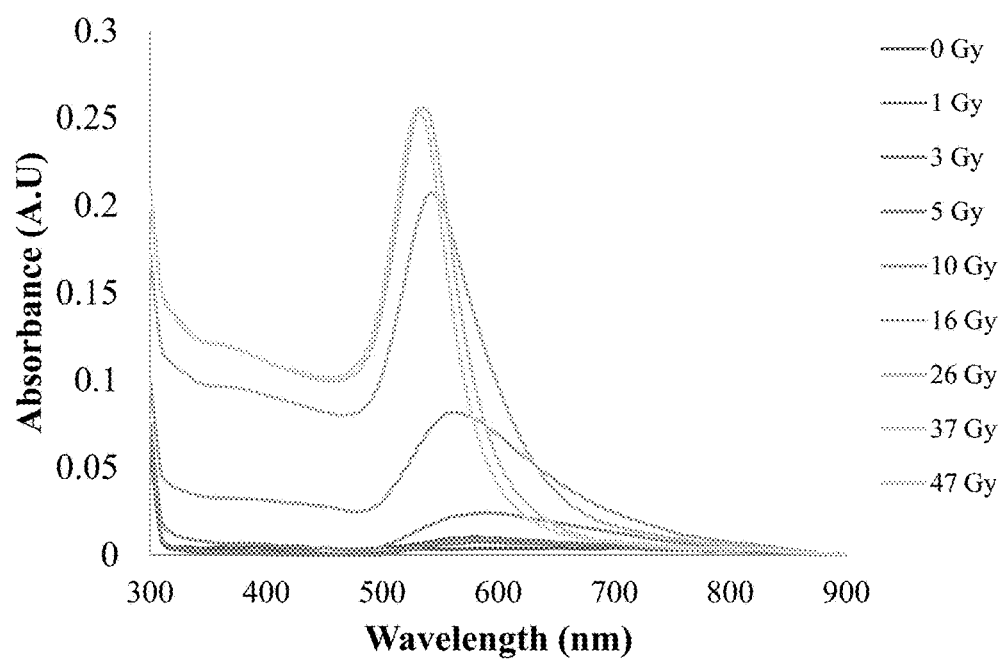
Figure 18D:
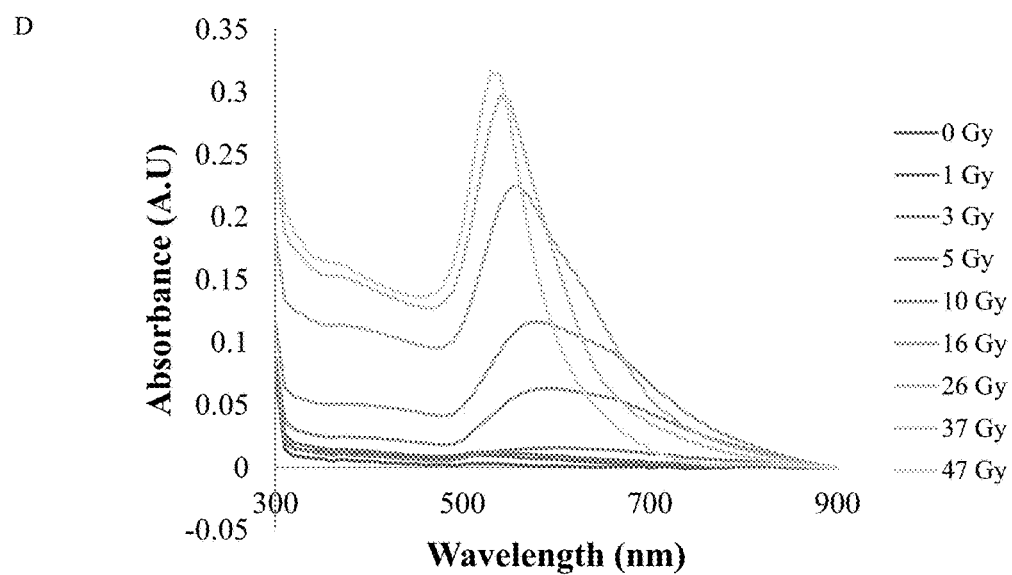
Figure 19A:
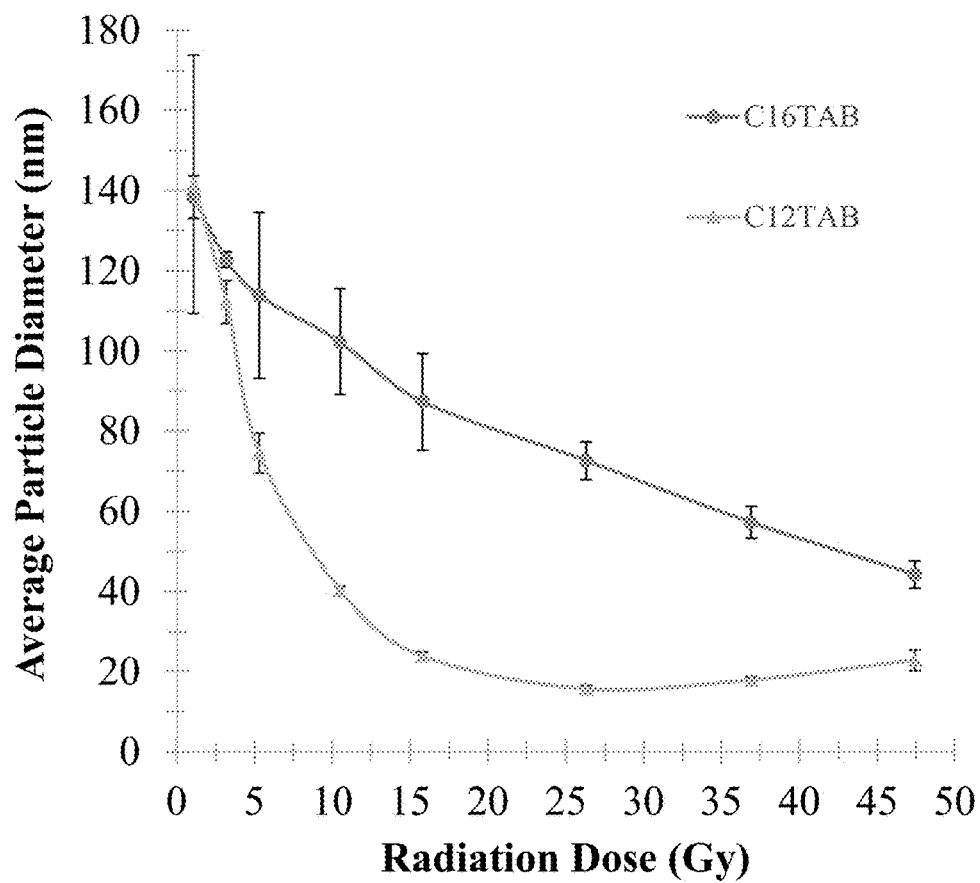
FIGS. 19A-19B show (FIG. 19A) Hydrodynamic diameter vs. radiation dose and (FIG. 19B) Hydrodynamic diameter vs. radiation dose (plotted on a $log_{10}$ on the X-axis).
Figure 19B:
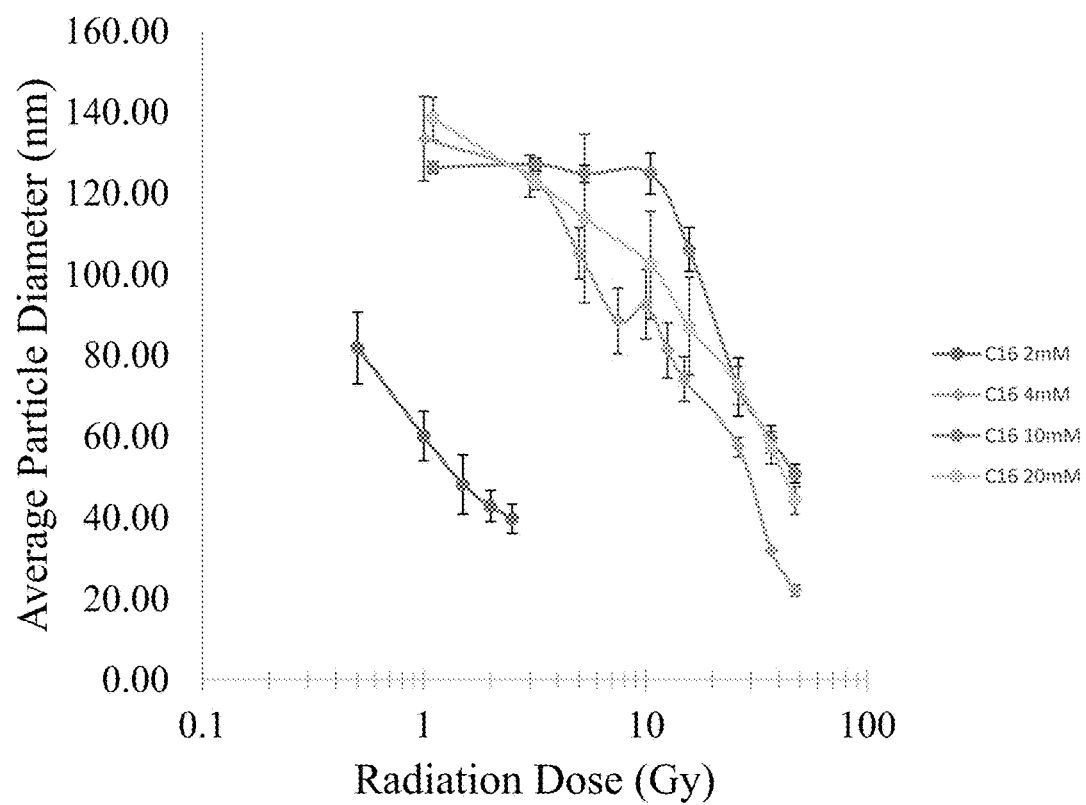
Figure 20A:
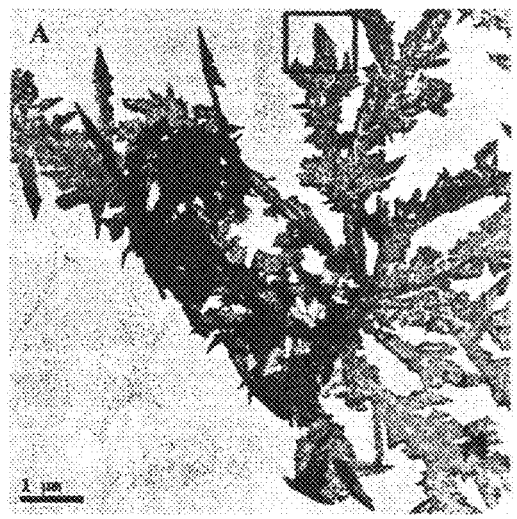
FIGS. 20A-20D show transmission electron microscopy (TEM) images of anisotropic nanostructures (FIG. 20A) dendritic and (FIG. 20C) nanowire-like structures formed in case of $C_{12}TAB$ at 5 Gy X-ray radiation dose and images (FIG. 20B) and (FIG. 20D) show magnified images of the highlighted regions inside the box from FIG.
Figure 20B:
Figure 20C:
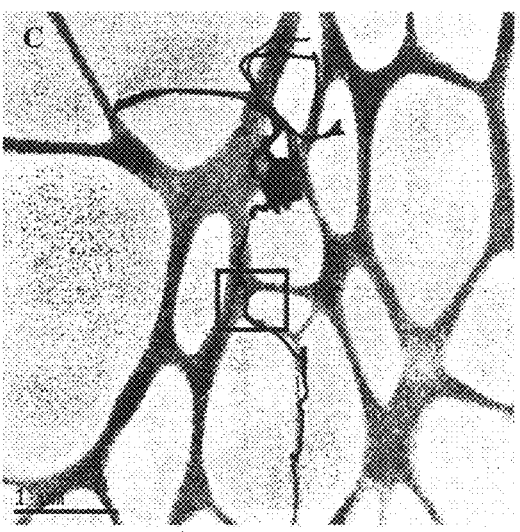
Figure 20D:
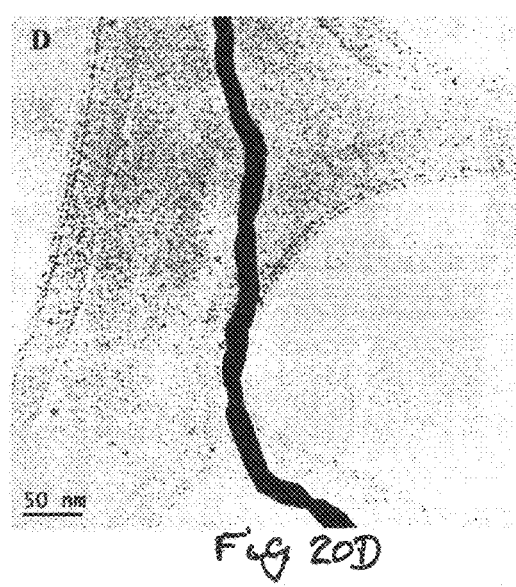
Figure 21A:
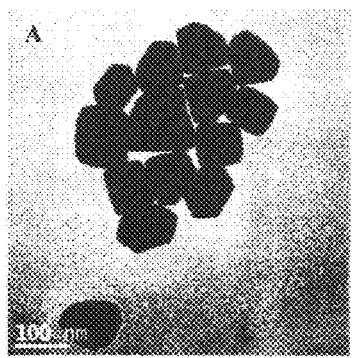
FIGS. 21A-21G show Transmission Electron Microscopy (TEM) images of nanoparticles formed after exposure to ionizing (X-ray) radiation using the following conditions of $C_{16}TAB$.
Figure 21B:
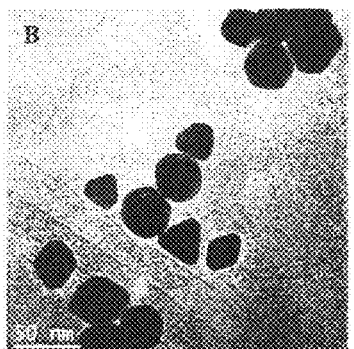
Figure 21C:
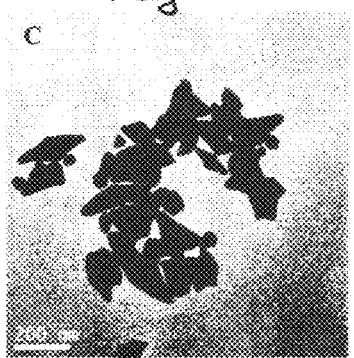
Figure 21D:
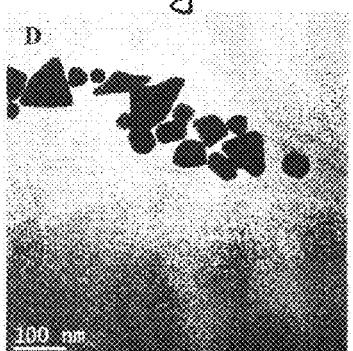
Figure 21E:
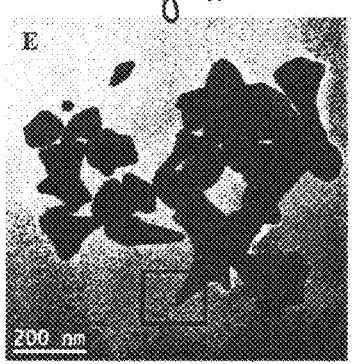
Figure 21F:
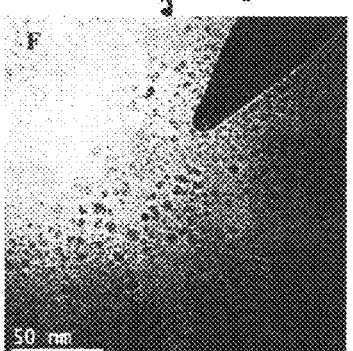
Figure 21G:
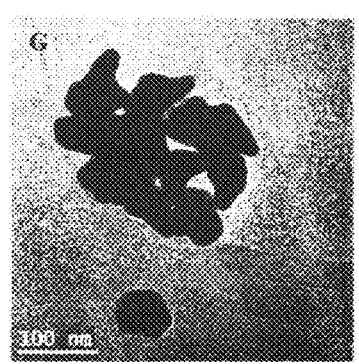

Use of $C_{16}TAB$ concentrations at and below the CMC (i.e. 0.7 and 0.2 mM) resulted in spontaneous formation of gold nanoparticles in absence of ionizing radiation; gold nanoparticle formation can be seen by the characteristic absorbance peak of the dispersion in FIGS. 17A-17C. However, the propensity for spontaneous nanoparticle is significantly reduced or lost at concentrations above the CMC. A distinct color change can be observed for radiation doses as low as 0.5 Gy for the lowest concentration of $C_{16}TAB$ above the CMC investigated (FIGS. 3A and 19A-19B). A linear response was observed for radiation doses ranging from 0.5 to 2 Gy under these conditions (FIGS. 5A-5D). As the concentration of $C_{16}TAB$ increases, the radiation dose required to template nanoparticle formation also increases (FIGS. 4 and 18A-18D). Furthermore, the color of the nanoparticle dispersion formed is significantly different in cases of 2 mM (blue-violet) $C_{16}TAB$ compared to that observed in cases of 4 mM (bluish-red), 10 mM (red/pink) and 20 mM (burgundy/maroon) $C_{16}TAB$, indicating different sizes of nanoparticles under these conditions. While it is most desired that the nanosensor is sensitive to therapeutic doses used in conventional and hyperfractionated radiotherapy (~0.5-2.2 Gy), these results indicate that the response of the plasmonic nanosensor can be tuned by simply modifying the concentration of the lipid surfactant.

Visual colorimetric sensors possess advantages of convenience and likely, cost, over those that employ fluorescence changes or electron spin resonance measurements for detecting ionizing radiation. The current plasmonic nanosensor shows increasing color intensity with increasing radiation dose (FIGS. 2A-2C and 3A-3E). The increase in color intensity with radiation dose is reflected in an increase in maximures 2 al (peak) absorbance values, which in turn, are surrogates for the concentrations of nanoparticles formed in the dispersion. Key features of gold nanoparticle absorbance spectra include the shape of the surface plasmon resonance band and the position of the maximal (peak) absorption wavelength. The width of the spectral profiles at lower doses signifies a somewhat polydisperse population of the nanoparticles (FIGS. 2A, 2B and FIG. 18A-18D). The absorbance peaks are red-shifted with decreasing radiation doses, suggesting an increase in particle size under these conditions compared to those obtained at higher doses.

Figure 1:
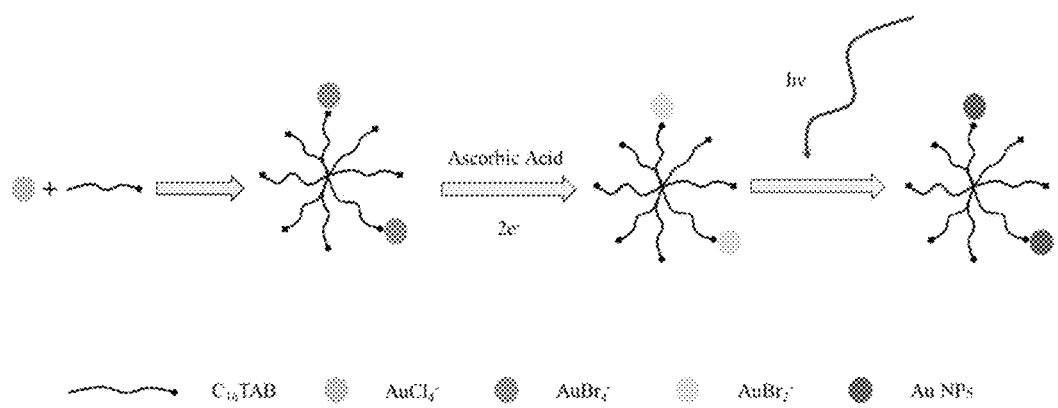
FIG. 1 shows a schematic (Adapted from Perez-Juste, J.; Liz-Marzán, L. M.; Carnie, S.; Chan, D. Y. C.; Mulvaney, P., Electric-Field-Directed Growth of Gold Nanorods in Aqueous Surfactant Solutions. Advanced Functional Materials 2004, 14 (6), 571-579.) depicting the reaction progress after addition of various components in the plasmonic nanosensor for ionizing radiation.

Free radicals generated upon radiolysis are thought to be localized in finite volumes called spurs. These spurs can expand, diffuse, and simultaneously, react, leading to the formation of molecular products. These highly reactive free radicals have very short lifetimes of ~$10^{-7}$-$10^{-6}$ at 25° C. Reaction volumes consisting of nanoscale features can facilitate enhanced reaction kinetics and ensure efficient utilization of these free radicals for the formation of nanoparticles. In case of the current plasmonic nanosensor, this was achieved by the use of amphiphilic molecules that self-assemble into micelles above their respective critical micellar concentrations (CMCs). A strong interaction is possible between the positively charged head group of the lipid surfactant micelles and the negatively charged $AuCl_4^-$ ions (FIG. 1). This interaction can lead to incorporation of $AuCl_4^-$ ions in the water-rich Stern layer leading to the formation of a 'nanoreactor'. However, spontaneous formation of nanoparticles (i.e. in absence of ionizing radiation) was seen when concentrations of $C_{16}TAB$ were lower than the CMC (FIGS. 17A-17C). One hypothesis is that spontaneous nanoparticle formation observed at lower concentrations of the surfactant is likely due to negligible steric hindrance between the surfactant and ascorbic acid; absence of these barriers results in nanoparticle growth which can be spectroscopically observed. It is only when the concentrations of $C_{12}TAB$ and $C_{16}TAB$ are higher than the CMC, that no spontaneous formation of gold nanoparticles is seen, and ionizing radiation is required to induce nanoparticle formation. This, therefore, acts as the functional principle behind the current plasmonic nanosensor. Of the three lipid surfactants, only the concentration of $C_8TAB$ was significantly below its CMC value (130 mM), while the concentrations employed were significantly higher than the CMCs of $C_{12}TAB$ (CMC=15 mM) and $C_{16}TAB$ (CMC=1 mM). In the case of $C_8TAB$, there is an absence of these "nanoreactors", which may explain lack of nanoparticle formation under these conditions. These observations suggest that interplay between surfactant chemistry and aggregation state determine nanoparticle formation by lipid-based surfactant molecules.

Figure 5A:
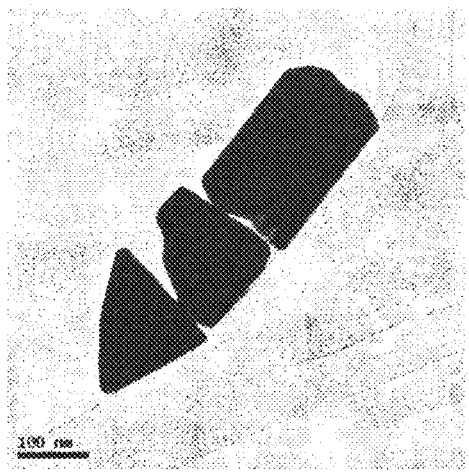
FIGS. 5A-5D show Transmission Electron Microscopy (TEM) images of nanoparticles after exposure to ionizing (X-ray) radiation using two different lipid surfactants, 20 mM $C_{16}TAB$ (left) and 20 mM $C_{12}TAB$ (right) for (FIG. 5A) 1 Gy, (FIG. 5B) 47 Gy, (FIG. 5C) 5 Gy and (FIG. 5D) 47 Gy.
Figure 5B:
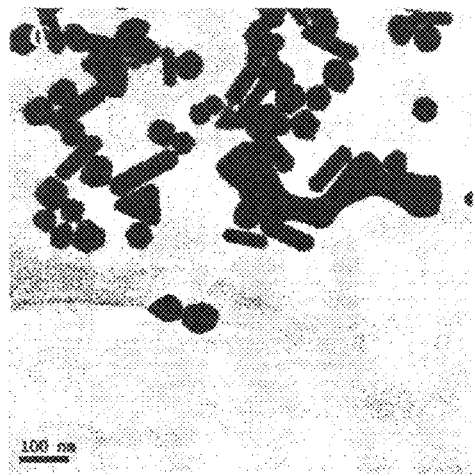
Figure 5C:
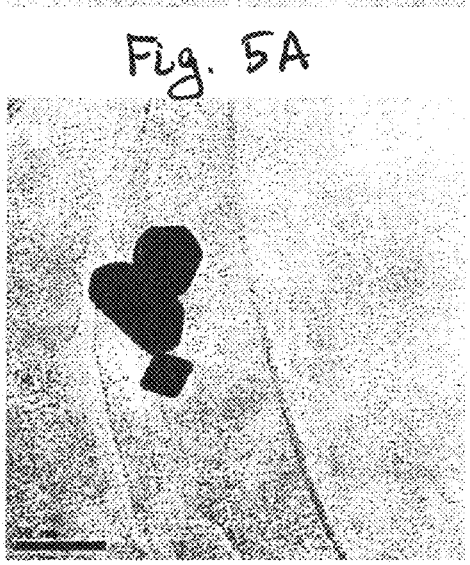
Figure 5D:

Nanoparticles formed in presence and absence of ionizing radiation were characterized for their morphology and hydrodynamic diameter using transmission electron microscopy (TEM; FIGS. 5A-5D, and FIGS. 20A-20D and 21A-21G) and dynamic light scattering (FIGS. 19A-19B), respectively. While $C_{16}TAB$-templated nanoparticles showed a single maximal absorption peak (at ca. 520 nm), $C_{12}TAB$- templated nanoparticles showed two peaks: one at ca. 520 nm (visual region) and another at ca. 700 nm (near infrared or NIR region; FIG. 2B), particularly at higher doses of ionizing radiation. TEM images indicated that a mixture of spherical and rod-shaped nanoparticles was observed at the higher radiation doses (47 Gy) in case of $C_{12}TAB$ as the templating surfactant (FIG. 5D). This explains the absorption spectral profile with peaks in both, the visual and near infrared range of the spectrum in case of nanoparticles templated using $C_{12}TAB$ (FIG. 2B). A significant decrease in the near infrared absorption peak is observed at lower X-ray doses. Although the spectral profile indicates formation of gold nanospheres, we observed an ensemble of unique anisotropic (dendritic and nanowire) structures (FIGS. 20A-20D). Such structures were not observed at similar X-ray doses in case of $C_{16}TAB$ as the templating surfactant.

The growth of gold nuclei from zerovalent gold species proceeds through continuous diffusion of unreacted metal ions and smaller seeds onto the growing nanocrystal surface. This, in turn, is governed by electrostatic interactions between the cationic micelle loaded with gold seeds and unreacted metal ions. In this case, it is likely that the gold nanoparticles aggregate more rapidly in situ due to the strong hydrophobic nature of the long of $C_{16}TAB$ chains, leading to the formation of quasi-spherical nanoparticles and not anisotropic nanostructures.

TEM images indicated a reduction in the size of the metal nanoparticles with increasing radiation dose. Dynamic light scattering (DLS) studies on irradiated samples (FIGS. 19A-19B and Table S1) indicated a linear decrease in nanoparticle hydrodynamic diameters with increases in X-ray dose, which is in good agreement with information from TEM images. High radiation doses generate a larger number of free radicals in comparison to lower radiation doses, which can lead to the reaction with and therefore, consumption of a higher number of metal ions. This leads to the formation of a higher concentration of zerovalent gold species in comparison to samples irradiated at lower doses. These unstable Au(0) seeds grow and are eventually capped by the cationic surfactant resulting in smaller sized nanoparticles. In contrast, at lower doses of ionizing radiation, the ratio of concentration of Au(0) to Au(I) is likely smaller. It is possible that unreacted metal ions coalesce with the smaller population of gold seeds and in turn lead to the formation of nanoparticles with larger diameters.

Figures 6A, 6B:
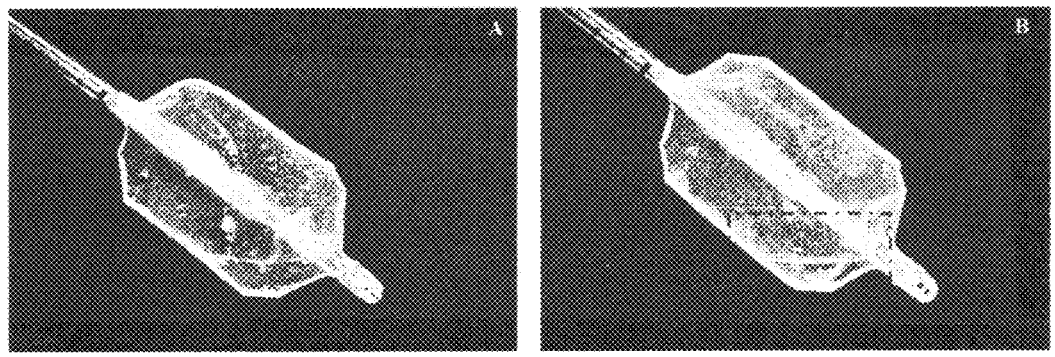
FIGS. 6A-6B show (FIG. 6A) an endorectal balloon with precursor solution before irradiation with X-rays and (FIG. 6B) endorectal balloon post irradiation with 10.5 Gy X-rays.

The translational potential of a plasmonic nanosensor for detecting X-ray radiation was investigated under conditions that simulate those employed in human prostate radiotherapy. Endorectal balloons are typically used for holding the prostate in place and for protecting the rectal wall during radiotherapy treatments in humans. The efficacy of the plasmonic nanosensor was evaluated in these balloons ex vivo; no studies on human patients were carried out. 1.5 ml of the precursor solution ($C_{16}TAB$ (20 mM)+AA+$HAuCl_4$) was incorporated into endorectal balloons as shown in FIG. 6A. The nanosensor precursor solution was subjected to two clinically relevant doses of 7.9 and 10.5 Gy (n=3). The absorbance of the plasmonic nanosensor, which changes color in the balloon itself (e.g. light pink color seen in FIG. 6B for a balloon subjected to a radiation dose of 10.5 Gy) was employed to determine the radiation dose delivered to the balloon. A calibration curve between 5 and 37 Gy from the plot between maximum absorbance and radiation dose after 7 hours was employed to determine the radiation dose delivered. Doses of 8.51±1.73 Gy and 7.85±2.05 Gy were calculated from the calibration curve for 10.5 Gy and 7.9 Gy respectively. Due to the nonlinearity of the curve below 5.3 Gy, the control (0 Gy) showed a value 4.38±0.41 Gy (n=3) when the calibration equation was employed, indicating that the operating region of the plasmonic nanosensor, with a CTAB concentration of 20 mM, is between 5 and 37 Gy and is not reliable for lower doses of radiation for CTAB concentrations of 20 mM (Table 1A).

Figure 7A:
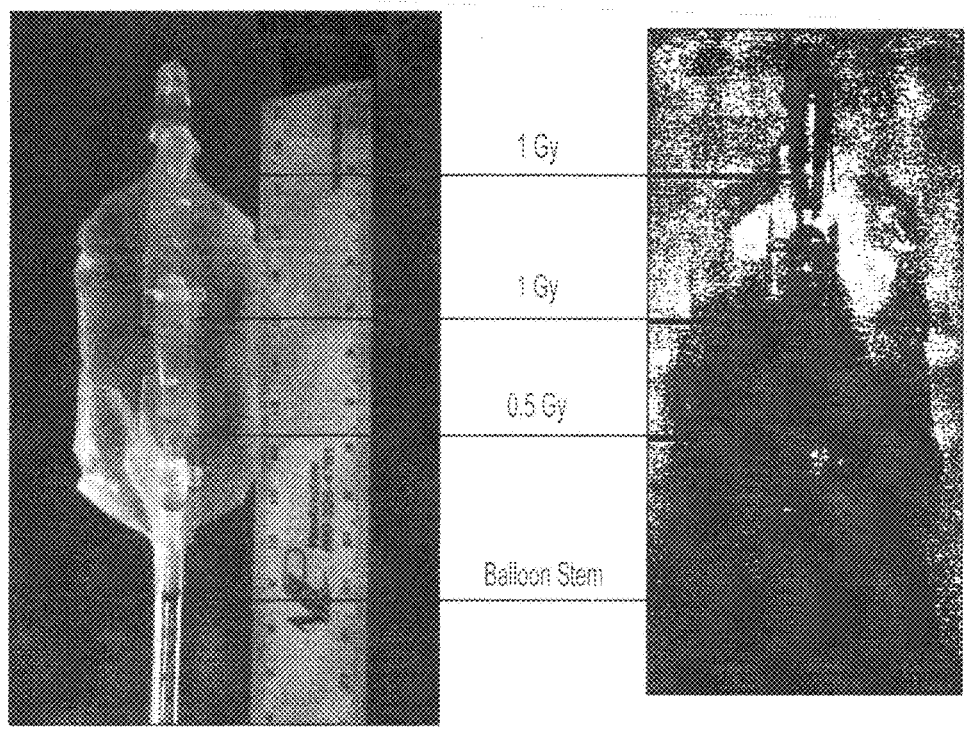
FIGS. 7A-7B show (FIG. 7A) digital image showing the nanoscale precursor solution (200 μL) in microcentrifuge tubes placed along the stem outside of an endorectal balloon and (FIG. 7B) X-Ray contrast image of the phantom which shows the dose treatment plan, prostate tissue, the endorectal balloon, and the microcentrifuge tube/nanosensor location below the prostate tissue and on the endorectal balloon.
Figure 7B:
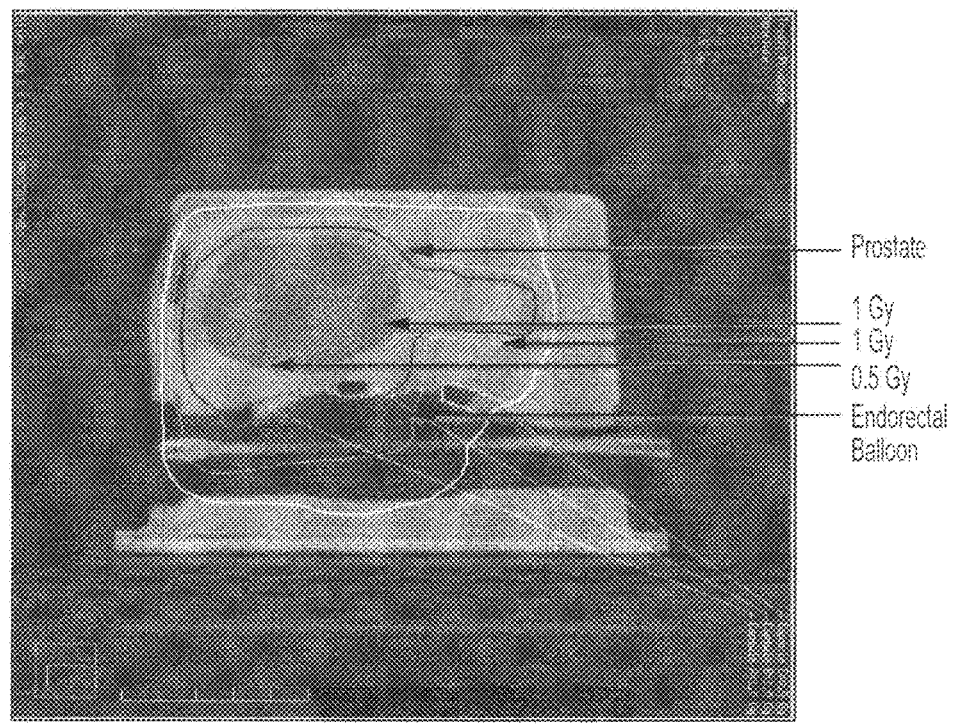
Figure 22A:
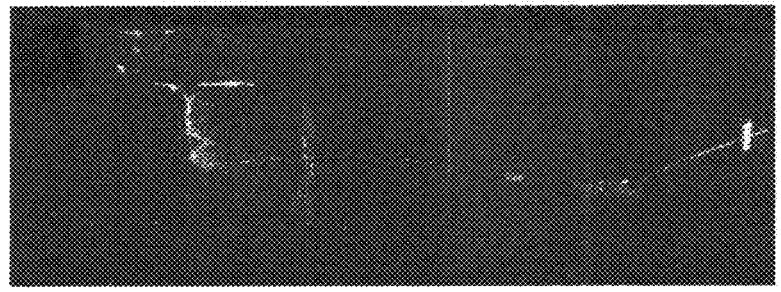
FIG. 22A shows a digital image of a phantom.
Figure 22B:
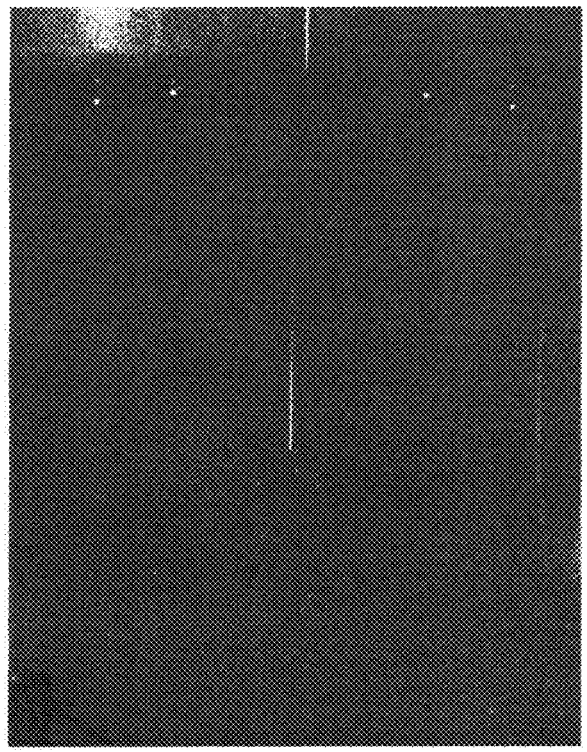
FIG. 22B show a digital image of the phantom irradiation set-up including the phantom shown in FIG. 22A on the linear accelerator at Banner MD Anderson.
Figure 23:
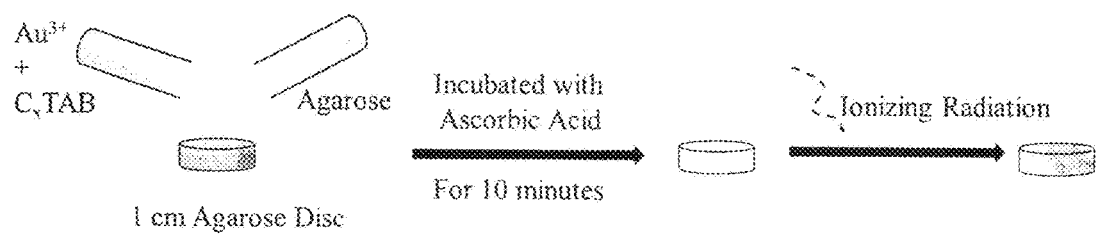
FIG. 23 shows a schematic diagram representing the fabrication of the hydrogel sensors for the detection of ionizing radiation -- a mixture of $HAuCl_4$ and $C_xTAB$ is mixed with liquid agarose and allowed to set in a circular mold, prior to radiation treatment ascorbic acid is allowed to diffuse into the gel from the top for 10 minutes, and this results in the formation of a colorless hydrogel and irradiation with high energy photons results in the formation of gold nanoparticles in the hydrogel along the region of irradiation.
Figure 24:
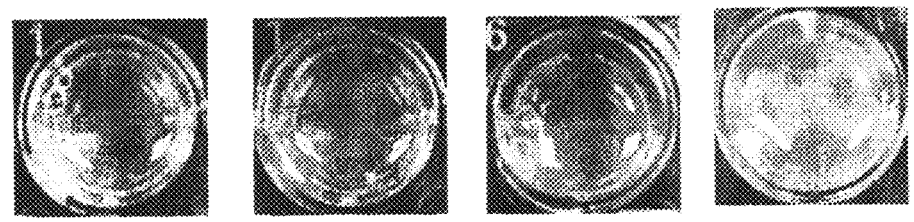
FIG. 24 shows optical images of the hydrogel containing $C_{16}TAB$ (Top) and $C_{12}TAB$ (Bottom) after t=1 hr with the irradiated doses indicated below each image.
Figure 24:
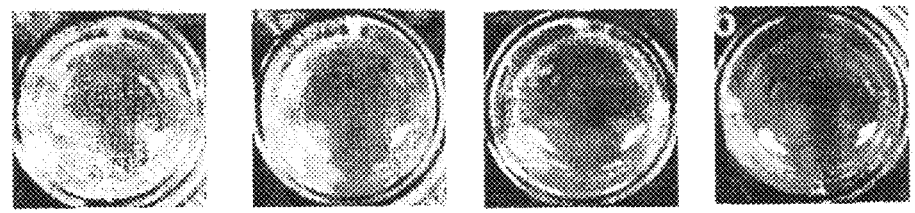
Figure 24:
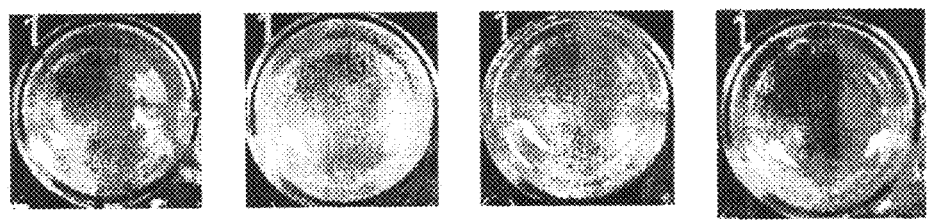
Figure 24:
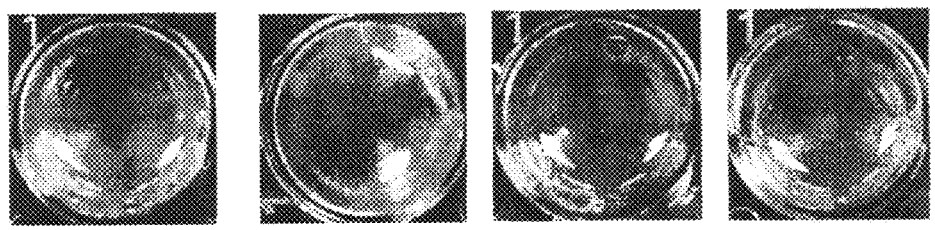
Figure 25:
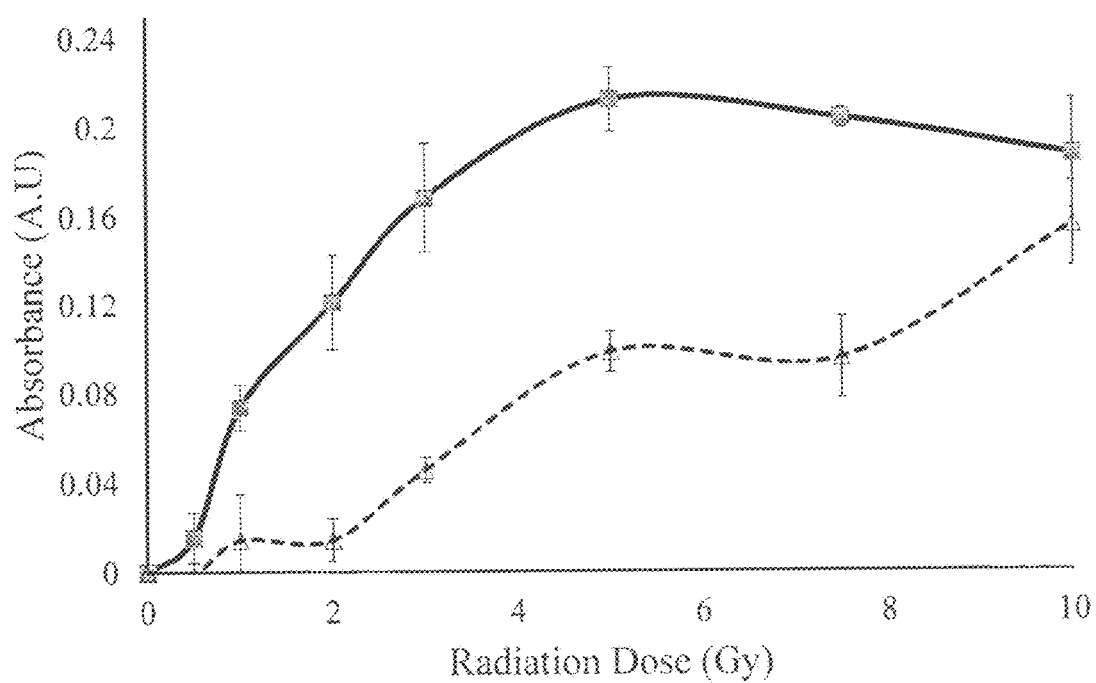
FIG. 25 shows Maximum absorbance vs Radiation dose post X-ray irradiation after t=1 hr with solid line representing (CuTAB) and dashed line representing $C_{16}TAB$.
Figure 26A:
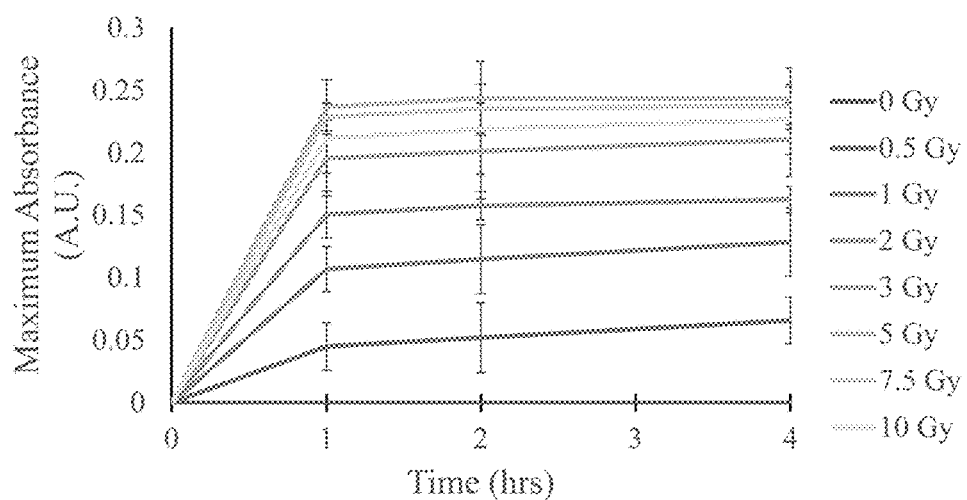
FIG. 26A show kinetics of gold nanoparticle formation following X-ray irradiation with a dose of $C_{12}TAB$ and the absorbance value reaching a steady state at t=1 hr and remaining stable over a period of 4 hours
Figure 26B:
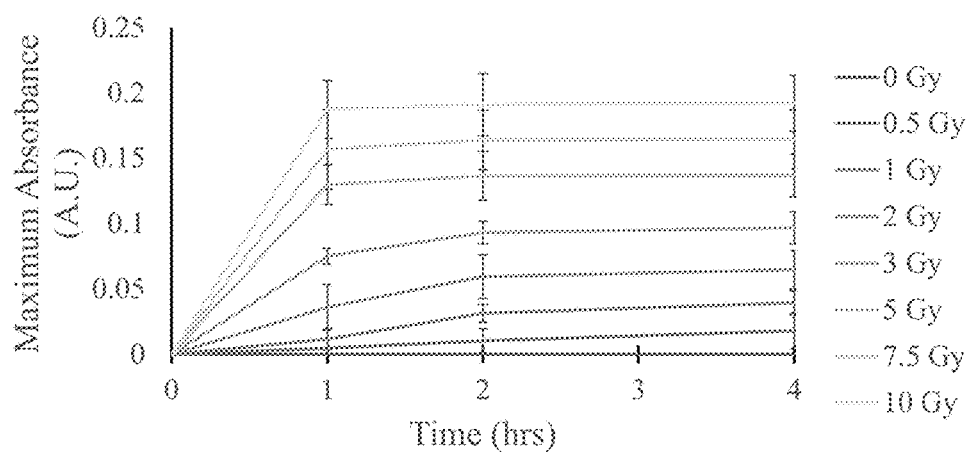
FIG. 26B shows kinetics of gold nanoparticle formation following X-ray irradiation with a dose of $C_{16}TAB$ and the absorbance value reaching a steady state at t=1 hr and remaining stable over a period of 4 hours.
Figure 27A:
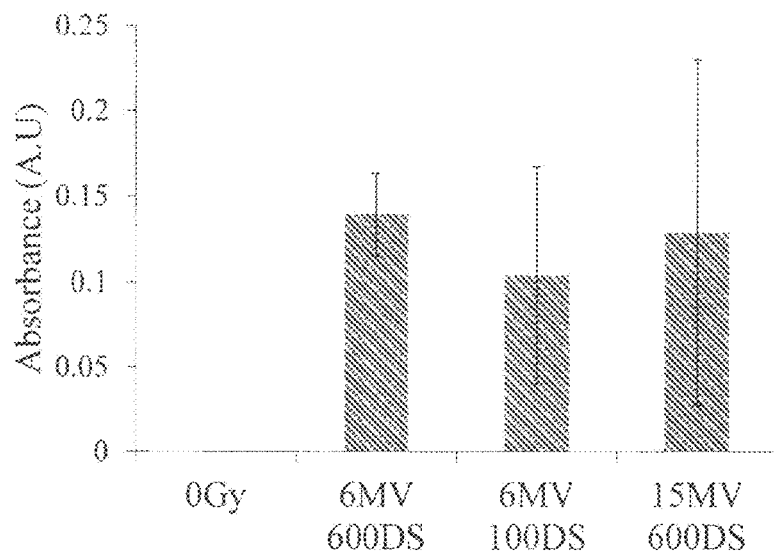
FIGS. 27A-27B (FIG. 27A) shows maximum absorbance of the hydrogels irradiated with 2 Gy with different dose rates and energy (6 MV and 15 MV) with no significant differences in absorbance observed at the above conditions and (FIG. 27B) ion chamber measurements to determine ionizing radiation attenuation with presence of heavy metal (Au) leading to minimal (not significant) dose attenuation with the ion chamber below the gel measuring the radiation that passes through the hydrogel.
Figure 27B:
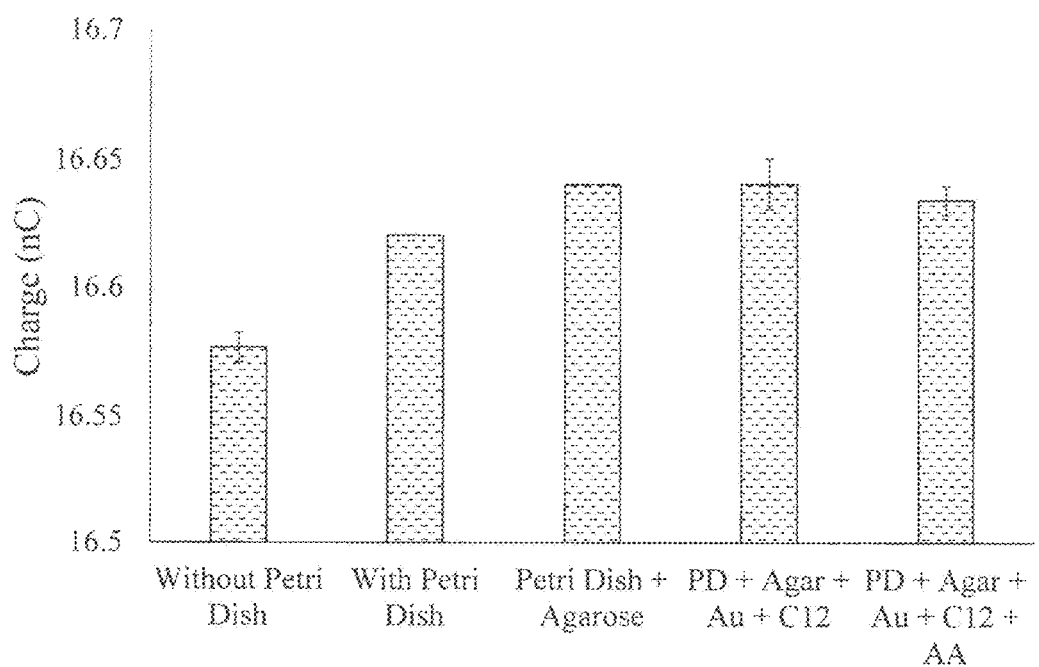
Figure 28:
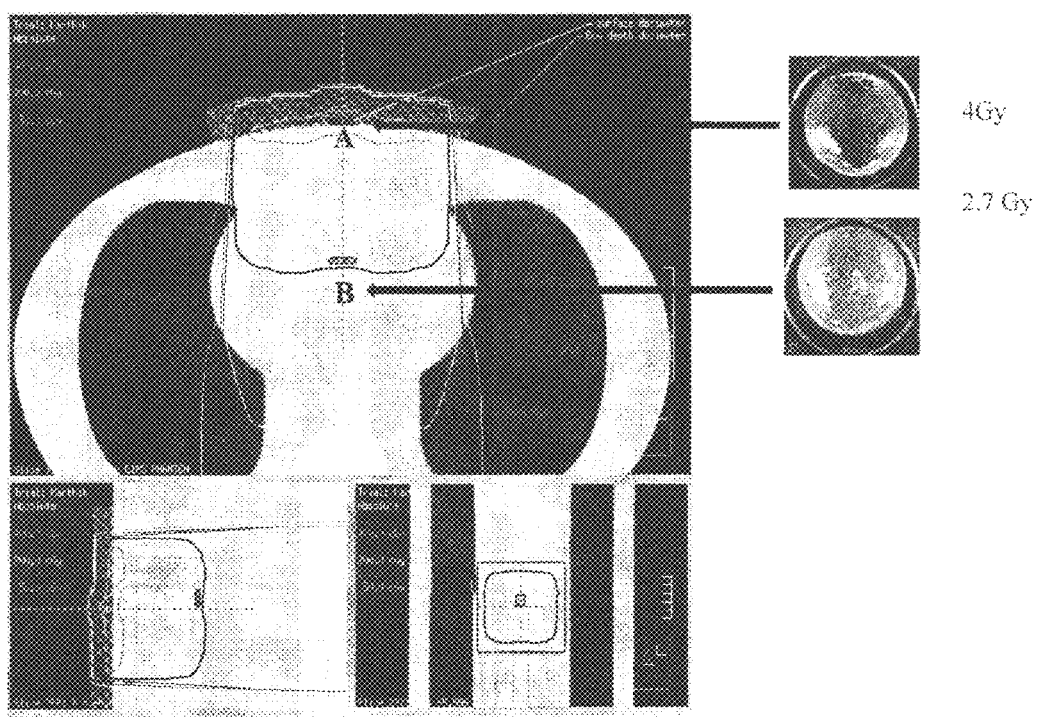
FIG. 28 shows an X-Ray contrast image of the phantom displaying the treatment plan (Left) and the optical images of the gel exposed under different irradiation conditions (Right) after t=2 hour.
Figure 29:
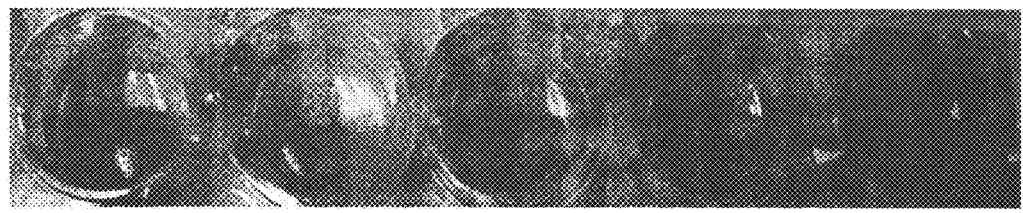
FIG. 29 shows addition of $Na_2S$ prevents diffusion of the nanoparticles from the irradiated region to the un-irradiated one.
Figure 30:
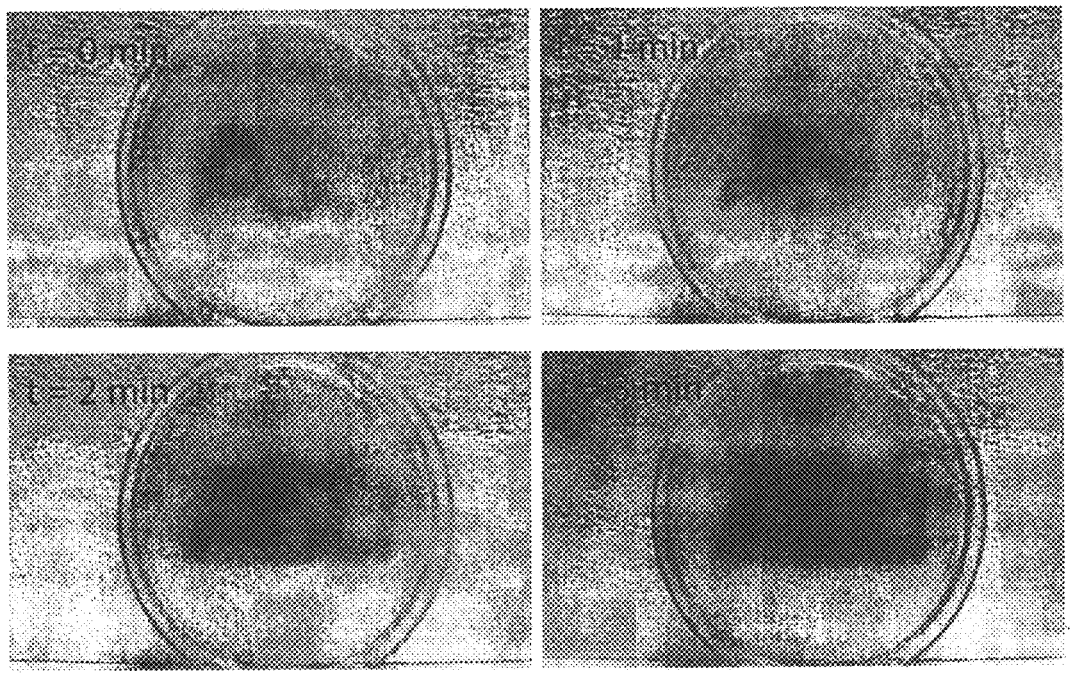
FIG. 30 shows time lapse images of formation of opaque pink regions irradiated in the hydrogel resulting in ASU logo at the end of three minutes.

Based on the above findings in the endorectal balloon, the detection efficacy of the plasmonic nanosensor in a phantom that is employed to simulate prostate radiotherapy treatments was investigated. In these studies, 200 μL of the precursor solution ($C_{16}TAB$ (2 mM)+AA+$HAuCl_4$) was filled in microcentrifuge tubes, which were then taped to the outside surface of an endorectal balloon such that they were aligned along the stem (FIG. 7A). The lower concentration of $C_{16}TAB$ was used, since this concentration results in detection between 0.5-2 Gy (FIGS. 3A-3E top panel). The prostate phantom, with the endorectal balloon placed under the simulated prostate tissue, was irradiated based on a treatment plan described in the Experimental section and shown in FIGS. 22A-22B and 7B. The prostate itself was irradiated with 1 Gy, while the dose fall off at the end was 0.5 Gy (n=3; FIG. 7B). Thus, two microcentrifuge tubes (capsules 1 and 2) along the stem of the balloon just below the prostate were subjected to 1 Gy, while the third one (capsule 3) outside the balloon was subjected to 0.5 Gy. This set up was employed in order to obtain spatial information on the delivered dose along the rectal wall in the tissue phantom.

Optical images (FIGS. 7A-7B) clearly indicate the formation of violet colored dispersions for capsules 1 and 2, while a dispersion of lighter intensity can be seen in capsule 3. The absorbance of the dispersions were measured 2 h following exposure to radiation, and a calibration curve was employed to estimate the radiation dose as indicated by the radiation sensor. Table 2 shows a comparison of the actual dose delivered and the dose estimated from the calibration of the plasmonic nanosensor. The plasmonic nanosensor indicates that capsules 1 and 2 received doses of 1.20±0.11 Gy and 1.17±0.16 Gy, respectively, while capsule 3 received a dose of 0.49±0.04 Gy (Table 2). These are highly reasonable estimates of the actual doses received by the capsules in the tissue phantom, and can be employed to obtain spatial information on the radiation dose delivered. Taken together, the results indicate the utility of the plasmonic nanosensor in as a simple detection system in simulated clinical settings.

An increasing color intensity with increasing radiation dose was observed in the nanosensor which possesses significant advantages of convenience over other sensors that for example rely on electron spin resonance or fluorescence changes. A developing solution which consisted of $Na_2S$ was added after irradiation of hydrogel. The $Na_2S$ solution was allowed to diffuse into the hydrogel for certain period of time ranging from 5 minutes to 15 minutes. Other time of additions were also studied. The addition of the developing solution gives the hydrogel the ability to record the radiation dose in 3-dimensions thus providing 3D information. This has an added advantage, particularly where dose gradients exist in the treatment plan.

The application discloses an easy to use, versatile and powerful nanoscale platform for dosimetry of therapeutically relevant doses of radiation. This method involves readily available chemicals, is easy to visualize due to the colorimetric nature of detection, and does not need expensive equipment for detection. While a 'yes/no' determination may be made by the naked eye, only an absorbance spectrophotometer is required for quantifying the radiation dose.

A visible color change also ensures the ease of detecting the radiation dose with the naked eye. It was found that both, $C_{12}TAB$ and $C_{16}TAB$ were able to function as templating molecules in the plasmonic nanosensor at concentrations above their critical micelle concentration (CMC). The sensitivity of the sensor to lower radiation doses is enhanced by modifying the concentration of $C_{16}TAB$, thus making this a highly versatile platform for a variety of applications. Apart from the surfactants used a list of other potential surfactants which could be employed are listed in the Table S2. The chemicals included in the list along with their derivatives are potential chemicals which could be used along with our sensor in its current form or in any other formulation. The metal ions used is not limited to gold. Any species either metallic or non-metallic can be used along with the sensor in its current form or in any other formulation. To name a few, ions of cobalt, iron, silver could be potential replacement for the proof of concept gold employed. The utility of the plasmonic nanosensor was demonstrated in translational applications; the plasmonic nanosensor was able to detect the delivered radiation dose with satisfactory accuracy when placed in an endorectal balloon ex vivo. In addition, the nanosenor was able to detect doses as low as 0.5 Gy and was able to report on the spatial distribution of radiation dose delivered when investigated using an endorectal balloon placed in a prostate tissue phantom. The translational application of such a dosimeter can help therapists with treatment planning and potentially enhance selectivity and efficacy of treatment. Apart from the medical field, this sensor could be employed where there is a need to detect ionizing radiation directly or indirectly.

Composition of Matter

Figure 8:
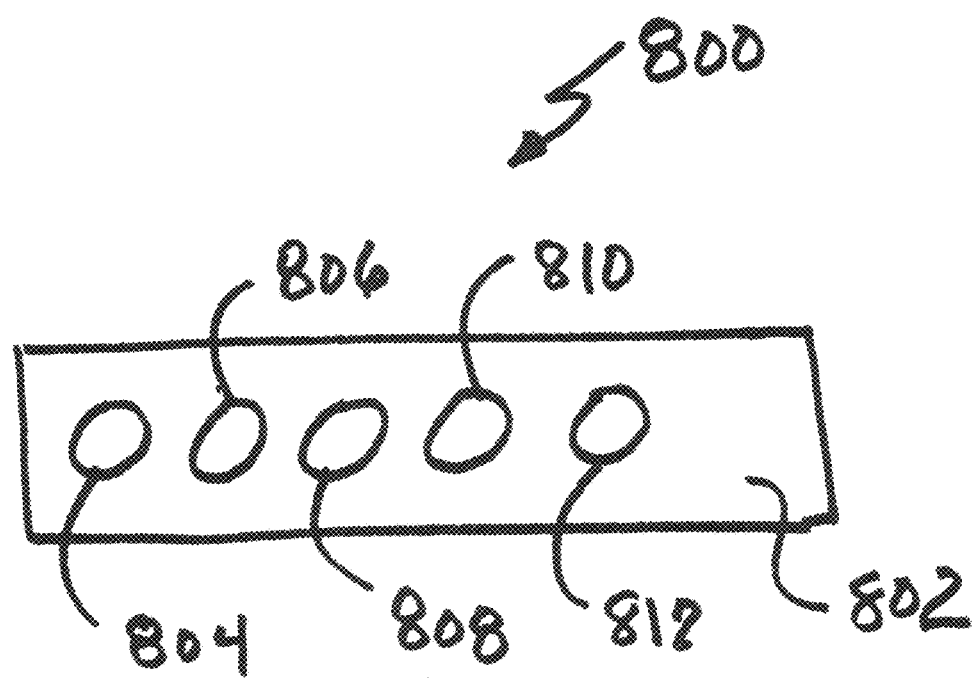
FIG. 8 shows an illustration of a composition of matter including a hydrogel.

FIG. 8 shows an illustration of a composition of matter 800 including a hydrogel 802. In some embodiments, the hydrogel 802 includes a metallic compound 804, a surfactant 806, an acid 808, an agarose 810, and water 812. A metallic compound is a compound that contains one or more metal elements. Exemplary metallic compounds 804 suitable for use in connection with the hydrogel 802 include metallic salts. An exemplary metallic salt includes a gold salt. An exemplary gold salt includes a salt of auric chloride ($HAuCl_4$). A surfactant is a compound that lowers the surface tension (or interfacial tension) between two liquids. Exemplary surfactants 806 suitable for use in connection with the hydrogel 802 include cationic surfactants. An exemplary cationic surfactant includes cetyl trimethylammonium bromide ($C_{16}TAB$). An acid is a chemical substance whose aqueous solutions are characterized by an ability to react with bases and certain metals to form salts. An exemplary acid 808 suitable for use in connection with the hydrogel 802 includes L-ascorbic acid. The agarose 810 is a linear polymer. In some embodiments the agarose 810 is made up of the repeating unit of agarobiose, which is a disaccharide made up of D-galactose and 3,6-anhydro-L-galactopyranose. In some embodiments, the hydrogel 802 is substantially colorless.

Method of Making a Hydrogel

Figure 9:
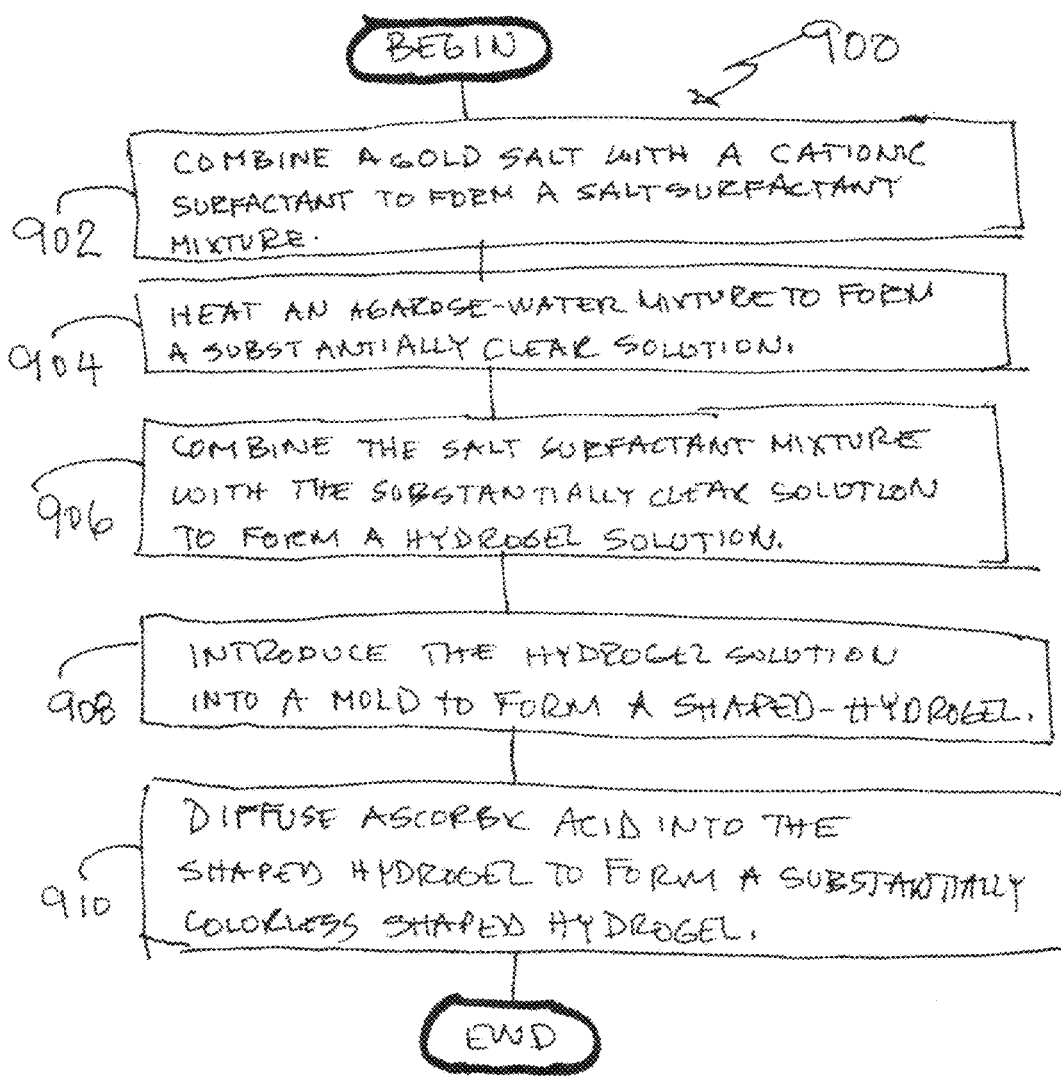
FIG. 9 shows a flow diagram of a method for forming a substantially colorless shaped-hydrogel.

FIG. 9 shows a flow diagram of a method 900 including combining a gold salt with a cationic surfactant to form a salt-surfactant mixture (block 902), heating an agarose-water mixture to form a substantially clear solution (block 904), combining the salt-surfactant mixture with the substantially clear solution to form a hydrogel solution (block 906), introducing the hydrogel solution into a mold to form a shaped-hydrogel (block 908), and diffusing ascorbic acid into the shaped-hydrogel to form a substantially colorless shaped-hydrogel (block 910). In some embodiments, combining the gold salt with the cationic surfactant to form the salt-surfactant mixture includes mixing a solution of 50 mM $C_{16}TAB$ with a solution of 10 mM $AU^{3+}$. In some embodiments, combining the salt-surfactant mixture with the substantially clear solution to form a hydrogel solution includes combining substantially equal amounts of the salt-surfactant and the substantially clear solution. In some embodiments, introducing the hydrogel solution into the mold to form the shaped hydrogel includes providing a disc shape mold to receive the hydrogel solution. In some embodiments, the method 900 further includes radiating the substantially colorless hydrogel.

In some embodiments a nanosensor includes five components (1) Gold salt, (2) Cationic surfactant, (3) Ascorbic acid, (4) Agarose and (5) water. 600 μL of 50 mM $C_{16}TAB$ is mixed with 30 μL of 10 mM Au3+. Agarose is dissolved in water to yield the required weight percentage. The agarose mixture is heated until a clear solution is obtained. 500 μL of the agarose is mixed with 500 μL of the gold-surfactant mixture. 650 μL of this liquid mixture is allowed to set in prefabricated molds which results in agarose discs with 1.5 cm in diameter. 650 μL of 10 mM ascorbic acid is allowed diffuse into the gel for 10 minutes leading to the formation of a transparent hydrogel. Addition of ascorbic acid to Au3+ reduces it from a trivalent state to a monovalent Au+ ion. Addition of cationic surfactant prevents complete conversion of Au3+ to gold nanoparticles. In the presence of ionizing radiation water split into three free radicals. Among these three radicals (1) hydrated electrons and (2) hydrogen are reducing in nature which assist in conversion of metal ions to their zerovalent forms reading it. These zerovalent metal nucleate and grow into metal nanoparticles which are capped by the cationic surfactant.

Apparatus

Figure 10:
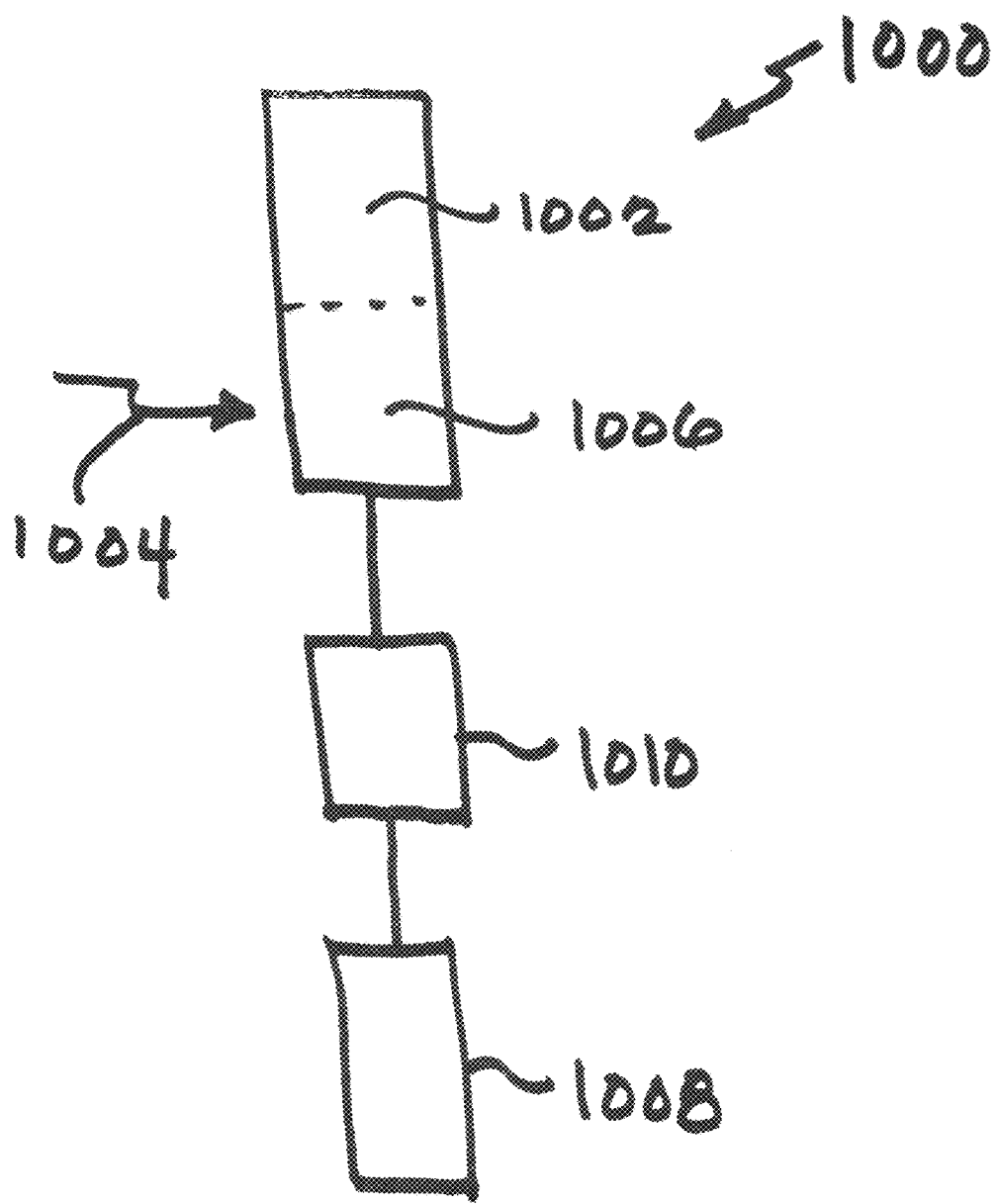
FIG. 10 shows a block diagram of an apparatus including a substantially colorless hydrogel to receive a low dose of radiation and form a radiated hydrogel having a color, and a detector optically coupled to the radiated hydrogel.

FIG. 10 shows a block diagram of an apparatus 1000 including a substantially colorless hydrogel 1002 to receive a low dose of radiation 1004 and form a radiated hydrogel 1006 having a color, and a detector 1008 optically coupled to the radiated hydrogel 1006. The detector 1008 is optically coupled to the radiated hydrogel 1006 by an optical path 1010. In some embodiments, the substantially colorless hydrogel 1002 includes a metallic salt. In some embodiments, the metallic salt includes a gold salt. In some embodiments, the detector 1008 includes a spectrophotometer 1012. In some embodiments, the detector 1008 includes a human visual system 1014. A human visual system is suitable for use in a variety of color measurement tasks and in particular for identifying changes in color. In some embodiments, the radiated hydrogel 1006 has a color and the color has a color intensity that increases with an increase in the low dose of ionizing radiation 1004.

The low dose of ionizing radiation 1004 is not limited to a particular radiation value. In some embodiments, the low dose of ionizing radiation 1004 includes a therapeutic range of values such as between about 0.5 Gy and about 2.0 Gy. In some embodiments, the low dose of ionizing radiation 1004 includes a range of values of between about 1.7 Gy and about 2.2 Gy. In some embodiments, the low dose of ionizing radiation 1004 includes a value of between about 3.0 Gy and about 10.0 Gy.

In operation, the substantially colorless hydrogel 1002 of the apparatus 1000 receives a low dose of ionizing radiation 1004 to form a radiated hydrogel 1006. In some embodiments, the radiated hydrogel 1006 includes a plasmonic nanoparticle 1016. A plasmonic nanoparticle is a particle whose electron density can couple with electromagnetic radiation having wavelengths that are larger than the particle due to the nature of the dielectric-metal interface between the medium and the particles.

The apparatus 1000 has sever advantages including providing spatial dose distribution, room temperature operation, use of visual spectrophotometer, and color change for visual identification of low dose ionizing radiation.

Experimental

Materials: Gold(III) chloride trihydrate ($HAuCl_4.3H_2O$), trimethyloctylammonium bromide ($C_8TAB$) (≥98%), dodecyltrimethylammonium bromide ($C_{12}TAB$) (≥98%) and L-Ascorbic acid (AA) were purchased from Sigma-Aldrich. Cetyl trimethylammonium bromide ($C_{16}TAB$) was purchased from MP chemicals. All chemicals were used as received from the manufacturer without any additional purification.

Sample Preparation for Irradiation: First, 30 µL of 0.01 M $HAuCl_4$ were mixed with 600 µL of 0.05 M $C_{x=8,12,16}TAB$. Upon addition of 30 µL (0.196 mM), 300 µL (1.96 mM), 600 µL (3.92 mM approximated as 4 mM) and 900 µL (5.88 mM) of 0.01 M L-Ascorbic acid, the solution turned colorless after shaking; the concentrations of ascorbic acid were thus varied in order to examine its effect on nanoparticle formation (FIGS. 12A-12B). Unless specifically mentioned, the volume of AA used is 900 µL. The measured pH of the solution was between 2.9 and 3.1. Samples were prepared at Banner-MD Anderson Cancer Center, Gilbert, Ariz. prior to radiation.

Radiation Conditions: A TrueBeam linear accelerator was used to irradiate the samples. Samples were radiated at a dose rate of (15.6 Gy/min). The samples containing surfactant at a concentration of 20 mM and 10 mM were radiated at doses of 0 (Control), 1.1, 3.2, 5.3, 10.5, 15.8, 26.3, 36.9 and 47.4 Gy. These are reported as 0, 1, 3, 5, 10, 16, 26, 37 and 47 Gy respectively in the article. The samples containing surfactant at a concentration 2 mM and 4 mM were irradiated with 0 (Control), 0.5, 1, 1.5, 2, 2.5, 3, 5, 7.5, 10, 12.5 and 15 Gy. After irradiation the samples were transported back to Arizona State University in Tempe, Ariz. (one-way travel time of approximately 30 minutes).

Absorbance Spectroscopy: Absorbance profiles of the radiated and the control samples were measured using a BioTek Synergy 2 plate reader. Absorbance values from 150 µL of sample were measured from 300 to 900 nm with a step size of 10 nm in a 96 well plate. Nanopure water (18.2 MΩcm) was used as a blank in all cases. The absorbance was corrected for offset by subtracting $A_{900}$ nm and the presence of a peak between 500 and 700 nm was used as an indicator for gold nanoparticle formation.

Determination of Critical Micellar Concentration (CMC): Pyrene (60 µL of $2\times10^{-5}$M) in acetone was added to 20 ml glass vials. Upon acetone evaporation, 2 ml of $C_{16}TAB$ of varying concentrations was added and stirred for 6 hours at room temperature. To achieve the similar conditions as the irradiation experiments, 30 µL of 10 mM gold salt+600 µL of the above prepared $C_{16}TAB$+900 µL of 10 mM ascorbic acid were mixed. A fluorescence spectrophotometer with an excitation scan range of 300-360 nm and an emission wavelength of 390 nm was used. Ratio of $I_{337}/I_{334}$ determined as a function of the surfactant concentration was used to calculate the CMC using pyrene as the probe based on methods described in the literature.

Dynamic Light Scattering (DLS) Measurements: 50 µL of the sample was transferred into a cuvette and placed into a Zetasizer Nano instrument. The software was set up to carry out measurements with autocorrelation. Thereafter, the average diameter along with the polydispersity index (PDI) were recorded based on the software readout.

Transmission Electron Microscopy (TEM): Samples for TEM were prepared by casting a drop of the solution onto a carbon film on a copper mesh grid. The samples were then dried in air. The above process was repeated several times to ensure good coverage. Dried samples were visualized using a CM200-FEG instrument operating at 200 kV.

TABLE 1

Absorbance values measured 7 hours following exposure of endorectal balloons with the plasmonic nanosensor (20 mM $C_{16}TAB$ concentration) following exposure to different doses of ionizing radiation. The calibration equation used was Absorbance = 0.0092 * Dose − 0.0356. The 0 Gy data point is outside the linear range (5-37 Gy) of the nanosensor, and the nanosensor is able to detect X-ray radiation in the linear range.

| Delivered Dose (Gy) | Measured Absorbance (A.U) | Calculated Dose from the calibration curve (Gy) | Average Radiation Dose Delivered ± S.D (Gy) |
|---|---|---|---|
| 0 | 0.003, 0.002, 0.009 | 4.19, 4.09, 4.85 | 4.38 ± 0.41 |
| 7.9 | 0.05, 0.015, 0.045 | 9.30, 5.50, 8.76 | 7.85 ± 2.05 |
| 10.5 | 0.061, 0.035, 0.032 | 10.50, 7.67, 7.35 | 8.51 ± 1.73 |

TABLE 2

X-ray Radiation dose determined using the plasmonic nanosensor placed on an endorectal balloon in a prostate phantom as shown in FIG. 8. The absorbance was determined 2 h after radiation exposure using the equation Absorbance = 0.1597 * Dose − 0.0542. 0.5 Gy to 1.5 Gy was the dose range used for determining the calibration curve. A $C_{16}TAB$ concentration of 2 mM was used in these studies.

| Capsule No. (Actual Dose Delivered in Gy) | Measured Absorbance (A.U) | Calculated Dose from the calibration curve (Gy) | Average Radiation Dose Delivered ± S.D (Gy) |
|---|---|---|---|
| 1 (1) | 0.12, 0.138, 0.154 | 1.09, 1.20, 1.30 | 1.20 ± 0.11 |
| 2 (1) | 0.105, 0.154, 0.137 | 1.00, 1.30, 1.20 | 1.17 ± 0.16 |
| 3 (0.5) | 0.016, 0.03, 0.025 | 0.44, 0.53, 0.50 | 0.49 ± 0.04 |

TABLE S1

Average hydrodynamic diameters of gold nanoparticles formed after irradiation along with their corresponding polydispersity indices.

| Surfactant | Dose | Average Diameter (nm) | STD DEV Diameter (nm) | Average Polydispersity Index (PDI) |
|---|---|---|---|---|
| $C_{16}$ 20 mM | 1 Gy | 138.4 | 5.3 | 0.2 |
| | 3 Gy | 122.8 | 1.9 | 0.2 |
| | 5 Gy | 121.1 | 20.7 | 0.3 |
| | 10 Gy | 102.3 | 13.2 | 0.2 |
| | 16 Gy | 88.5 | 12.1 | 0.2 |
| | 26 Gy | 72.6 | 4.7 | 0.2 |
| | 37 Gy | 57.3 | 4.0 | 0.3 |
| | 47 Gy | 45.5 | 3.4 | 0.3 |
| $C_{16}$ 2 mM | 0.5 Gy | 81.9 | 8.9 | 0.3 |
| | 1 Gy | 60.2 | 6.1 | 0.3 |
| | 1.5 Gy | 48.2 | 7.3 | 0.4 |
| | 2 Gy | 42.9 | 3.8 | 0.4 |
| | 2.5 Gy | 39.8 | 3.6 | 0.4 |
| $C_{16}$ 4 mM | 1 Gy | 133.4 | 10.4 | 0.2 |
| | 3 Gy | 124.2 | 5.2 | 0.2 |
| | 5 Gy | 105.3 | 6.3 | 0.2 |
| | 7.5 Gy | 88.6 | 8.1 | 0.3 |
| | 10 Gy | 92.6 | 8.6 | 0.3 |
| | 12.5 Gy | 81.3 | 6.9 | 0.3 |
| | 15 Gy | 74.2 | 5.5 | 0.3 |
| | 26 Gy | 57.4 | 2.4 | 0.3 |
| | 37 Gy | 32.0 | 0.4 | 0.5 |
| | 47 Gy | 22.1 | 1.3 | 0.6 |

TABLE S1-continued

Average hydrodynamic diameters of gold nanoparticles formed after irradiation along with their corresponding polydispersity indices.

| Surfactant | Dose | Average Diameter (nm) | STD DEV Diameter (nm) | Average Polydispersity Index (PDI) |
|---|---|---|---|---|
| $C_{16}$ 10 mM | 1 Gy | 126.4 | 1.5 | 0.2 |
| | 3 Gy | 127.1 | 1.6 | 0.2 |
| | 5 Gy | 124.8 | 2.1 | 0.2 |
| | 10 Gy | 124.9 | 5.0 | 0.2 |
| | 16 Gy | 106.2 | 5.4 | 0.2 |
| | 26 Gy | 72.2 | 7.1 | 0.2 |
| | 37 Gy | 59.4 | 3.3 | 0.3 |
| | 47 Gy | 50.9 | 2.3 | 0.2 |
| $C_{12}$ 20 mM | 1 Gy | 141.6 | 32.2 | 0.5 |
| | 3 Gy | 112.2 | 5.3 | 0.2 |
| | 5 Gy | 75.2 | 5.0 | 0.3 |
| | 10 Gy | 40.4 | 1.0 | 0.5 |
| | 16 Gy | 23.9 | 1.1 | 0.6 |
| | 26 Gy | 15.7 | 0.8 | 0.6 |
| | 37 Gy | 17.9 | 0.7 | 0.6 |
| | 47 Gy | 21.6 | 2.7 | 0.6 |

TABLE S2

A list of surfactants which could be potentially used as an alternative to the current surfactants. Any derivative of the above compounds could also be potentially used.

| Surfactant Name | Molecular Formula |
|---|---|
| Acetylcholine chloride ≥99% (TLC) | $C_7H_{16}ClNO_2$ |
| Aliquat ® 336 | |
| (2-Aminoethyl)trimethylammonium chloride hydrochloride 99% | $C_5H_{15}ClN_2 \cdot HCl$ |
| Arquad ® 2HT-75 | |
| Benzalkonium chloride ≥95.0% (T) | |
| Benzalkonium chloride | |
| Benzalkoniun chloride solution PharmaGrade. | |
| Benzalkoniun chloride solution ≥50% (via Cl), 50% in $H_2O$ | |
| Benzyldimethyldecylammonium chloride ≥97.0% (AT) | $C_{19}H_{34}ClN$ |
| Benzyldimethyldodecylammonium chloride ≥99.0% (AT) | $C_{21}H_{38}ClN$ |
| Benzyldimethylhexadecylammonium chloride ≥97.0% (dried material, AT) | $C_{25}H_{46}ClN$ |
| Benzyldimethylhexylammonium chloride ≥96.0% (AT) | $C_{15}H_{26}ClN$ |
| Benzyldimethyl(2-hydroxyethyl)ammonium chloride ≥97.0% (AT) | $C_{11}H_{18}ClNO$ |
| Benzyldimethyloctylammonium chloride ≥96.0% (AT) | $C_{17}H_{30}ClN$ |
| Benzyldimethyltetradecylammonium chloride anhydrous, ≥99.0% (AT) | $C_{23}H_{42}ClN$ |
| Benzyldimethyltetradecylammonium chloride dihydrate ≥98% | $C_{23}H_{42}ClN \cdot 2H_2O$ |
| Benzyldodecyldimethylammonium bromide ≥99.0% | $C_{21}H_{38}BrN$ |
| Benzyldodecyldimethylammonium bromide purum, ≥97.0% (AT) | $C_{21}H_{38}BrN$ |
| Benzyltributylammonium bromide ≥99.0% | $C_{19}H_{34}BrN$ |
| Benzyltributylammonium chloride ≥98% | $C_{19}H_{34}ClN$ |
| Benzyltributylammonium iodide 97% | $C_{19}H_{34}IN$ |
| Benzyltriethylammonium bromide 99% | $C_{13}H_{22}BrN$ |
| Benzyltriethylammonium chloride 99% | $C_{13}H_{22}ClN$ |
| Benzyltriethylammonium chloride monohydrate 97% | $C_{13}H_{22}ClN \cdot H_2O$ |
| Benzyltrimethylammonium bromide 97% | $C_{10}H_{16}BrN$ |
| Benzyltrimethylammonium chloride purum, ≥98.0% (AT) | $C_{10}H_{16}ClN$ |
| Benzyltrimethylammonium chloride 97% | $C_{10}H_{16}ClN$ |
| Benzyltrimethylammonium chloride solution technical, ~60% in $H_2O$ | $C_{10}H_{16}ClN$ |
| Benzyltrimethylammonium dichloroiodate 97% | $C_{10}H_{16}Cl_2IN$ |
| Benzyltrimethylammonium tetrachloroiodate ≥98.0% (AT) | $C_{10}H_{16}Cl_4IN$ |
| Benzyltrimethylammonium tribromide pumm, ≥97.0% (AT) | $C_{10}H_{16}Br_3N$ |
| Benzyltrimethylammonium tribromide 97% | $C_{10}H_{16}Br_3N$ |
| Bis(triphenylphosphomnylidene)ammonium chloride 97% | $C_{36}H_{30}ClNP_2$ |
| Boc-D-Lys(2-Cl-Z)-OH ≥98.0% (TLC) | $C_{19}H_{27}ClN_2O_6$ |
| (2-Bromoethyl)trimethylammonium bromide 98% | $C_5H_{13}Br_2N$ |
| (5-Bromopentyl)trimethylammonium bromide 97% | $C_8H_{19}Br_2N$ |
| (3-Bromopropyl)trimethylammonium bromide 97% | $C_6H_{15}Br_2N$ |
| S-Butyrylthiocholine iodide puriss., ≥99.0% (AT) | $C_9H_{20}INOS$ |
| Carbamoylcholine chloride 99% | $C_6H_{15}ClN_2O_2$ |
| (3-Carboxypropyl)trimethylammonium chloride technical grade | $C_7H_{16}ClNO_2$ |
| Cetyltrimethylammonium chloride solution 25 wt. % in $H_2O$ | $C_{19}H_{42}ClN$ |
| Cetyltrimethylammonium hydrogensulfate 99% | $C_{19}H_{43}NO_4S$ |
| (2-Chloroethyl)trimethylammonium chloride 98% | $C_5H_{13}Cl_2N$ |
| (3-Chloro-2-hydroxypropyl)trimethylammonium chloride | $C_6H_{15}Cl_2NO$ |

TABLE S2-continued

A list of surfactants which could be potentially used as an alternative to the current surfactants. Any derivative of the above compounds could also be potentially used.

| Surfactant Name | Molecular Formula |
|---|---|
| solution purum, ~65% in H₂O (T) | |
| (3-Chloro-2-hydroxypropyl)trimethylammonium chloride solution 60 wt. % in H₂O | $C_6H_{15}Cl_2NO$ |
| Choline chloride ≥99% | $C_5H_{14}ClNO$ |
| Decyltrimethylammonium bromide ≥98.0% (NT) | $C_{13}H_{30}BrN$ |
| Diallyldimethylammonium chloride ≥97.0% (AT) | $C_8H_{16}ClN$ |
| Diallyldimethylammonium chloride solution 65 wt. % in H₂O | $C_8H_{16}ClN$ |
| Didecyldimethylammonium bromide 98% | $C_{22}H_{48}BrN$ |
| Didodecyldimethylammonium bromide 98% | $C_{26}H_{56}BrN$ |
| Dihexadecyldimethylammonium bromide 97% | $C_{34}H_{72}BrN$ |
| Dimethyldioctadecylammonium bromide ≥98.0% (AT) | $C_{38}H_{80}BrN$ |
| Dimethyldioctadecylammonium chloride ≥97.0% (AT) | $C_{38}H_{80}ClN$ |
| Dimethylditetradecylammonium bromide ≥97.0% (NT) | $C_{30}H_{64}BrN$ |
| Dimethyloctadecyl[3-(trimethoxysilyl)propyl]ammonium chloride solution 42 wt. % in methanol | $C_{26}H_{58}ClNO_3Si$ |
| Dodecylethyldimethylammonium bromide ≥98.0% (AT) | $C_{16}H_{36}BrN$ |
| Dodecyltrimethylammonium chloride ≥99.0% (AT) | $C_{15}H_{34}ClN$ |
| Dodecyltrimethylammonium chloride purum, ≥98.0% (AT) | $C_{15}H_{34}ClN$ |
| Domiphen bromide 97% | $C_{22}H_{40}BrNO$ |
| Ethyltrimethylammonium iodide ≥99.0% | $C_5H_{14}IN$ |
| Girard's reagent T 99% | $C_5H_{14}ClN_3O$ |
| Glycidyltrimethylammonium chloride technical, ≥90% (calc. based on dry substance, AT) | $C_6H_{14}ClNO$ |
| Heptadecafluorooctanesulfonic acid tetraethylammonium salt purum, ≥98.0% (T) | $C_{16}H_{20}F_{17}NO_3S$ |
| Heptadecafluorooctanesulfonic acid tetraethylammonium salt 98% | $C_{16}H_{20}F_{17}NO_3S$ |
| Hexadecyl(2-hydroxyethyl)dimethylammonium dihydrogen phosphate solution ~30% in H₂O | $C_{20}H_{46}NO_5P$ |
| Hexadecyltrimethylammonium bisulfate purum, ≥97.0% (T) | $C_{19}H_{43}NO_4S$ |
| Hexadecyltrimethylammonium bromide ≥96.0% (AT) | $C_{19}H_{42}BrN$ |
| Hexadecyltrimethylammonium chloride ≥98.0% (NT) | $C_{19}H_{42}ClN$ |
| Hexadecyltrimethylammonium chloride solution purum, ~25% in H₂O | $C_{19}H_{42}ClN$ |
| Hexamethonium bromide ≥95.0% (AT) | $C_{12}H_{30}Br_2N_2$ |
| Hexyltrimethylammonium bromide ≥98.0% (AT) | $C_9H_{22}BrN$ |
| Hyamine ® 1622 solution 4 mM in H₂O | |
| Malondialdehyde tetrabutylammonium salt ≥96.0% (NT) | $C_{19}H_{39}NO_2$ |
| Methyltrioctylammonium bromide 97% | $C_{25}H_{54}BrN$ |
| Methyltrioctylammonium chloride ≥97.0% (AT) | $C_{25}H_{54}ClN$ |
| Methyltrioctylammonium hydrogen sulfate ≥95.0% (T) | $C_{25}H_{55}NO_4S$ |
| Methyltrioctylammonium thiosalicylate ≥95% (C) | $C_{32}H_{59}NO_2S$ |
| Myristyltrimethylammonium bromide 98% (AT) | $C_{17}H_{38}BrN$ |
| (4-Nitrobenzyl)trimethylammonium chloride 98% | $C_{10}H_{15}ClN_2O_2$ |
| OXONE ® tetrabutylammonium salt technical, ~1.6% active oxygen basis | |
| Tetrabutylammonium acetate for electrochemical analysis, ≥99.0% | $C_{18}H_{39}NO_2$ |
| Tetrabutylammonium acetate 97% | $C_{18}H_{39}NO_2$ |
| Tetrabutylammonium acetate technical, ≥90% (T) | $C_{18}H_{39}NO_2$ |
| Tetrabutylammonium acetate solution 1.0M in H₂O | $C_{18}H_{39}NO_2$ |
| Tetrabutylammonium benzoate for electrochemical analysis, ≥99.0% | $C_{23}H_{41}NO_2$ |
| Tetrabutylammonium bisulfate puriss., ≥99.0% (T) | $C_{16}H_{37}NO_4S$ |
| Tetrabutylammonium bisulfate purum, ≥97.0% (T) | $C_{16}H_{37}NO_4S$ |
| Tetrabutylammonium bisulfate solution ~55% in H₂O | $C_{16}H_{37}NO_4S$ |
| Tetrabutylammonium bromide ACS reagent, ≥98.0% | $C_{16}H_{36}BrN$ |
| Tetrabutylammonium bromide ReagentPlus ®, ≥99,0% | $C_{16}H_{36}BrN$ |
| Tetrabutylammonium bromide solution 50 wt. % in H₂O | $C_{16}H_{36}BrN$ |
| Tetrabutylammonium chloride ≥97.0% (NT) | $C_{16}H_{36}ClN$ |
| Tetrabutylammonium chloride hydrate 98% | $C_{16}H_{36}ClN$ |
| Tetrabutylammonium cyanate technical | $C_{17}H_{36}N_2O$ |
| Tetrabutylammonium cyanide purum, ≥95.0% (AT) | $C_{17}H_{36}N_2$ |
| Tetrabutylammonium cyanide 95% | $C_{17}H_{36}N_2$ |
| Tetrabutylammonium cyanide technical, ≥80% | $C_{17}H_{36}N_2$ |
| Tetrabutylammonium difluorotriphenylsilicate 97% | $C_{34}H_{51}F_2NSi$ |
| Tetrabutylammonium difluorotriphenylstannate 97% | $C_{34}H_{51}F_2NSn$ |
| Tetrabutylammonium glutaconaldehyde enolate hydrate ≥97.0% (T) | $C_{21}H_{41}NO_2 \cdot xH_2O$ |
| Tetrabutylammonium heptadecafluorooctanesulfonate ≥95.0% (H-NMR) | $C_{24}H_{36}F_{17}NO_3S$ |
| Tetrabutylammonium hexafluorophosphate for electrochemical analysis, ≥99.0% | $C_{16}H_{36}F_6NP$ |
| Tetrabutylammonium hexafluorophosphate pumm, ≥98.0% (CHN) | $C_{16}H_{36}F_6NP$ |
| Tetrabutylammonium hexafluorophosphate 98% | $C_{16}H_{36}F_6NP$ |
| Tetrabutylammonium hydrogen difluoride solution technical, ~50% in methylene chloride (T) | $C_{16}H_{37}F_2N$ |
| Tetrabutylammonium hydrogen difluoride solution ~50% in acetonitrile | $C_{16}H_{37}F_2N$ |
| Tetrabutylammonium hydrogensulfate anhydrous, free-flowing, | $C_{16}H_{37}NO_4S$ |

TABLE S2-continued

A list of surfactants which could be potentially used as an alternative to the current surfactants. Any derivative of the above compounds could also be potentially used.

| Surfactant Name | Molecular Formula |
|---|---|
| Redi-Dri ™, 97% | |
| Tetrabutylammonium hydrogensulfate 97% | $C_{16}H_{37}NO_4S$ |
| Tetrabutylammonium iodide for electrochemical analysis, ≥99.0% | $C_{16}H_{36}IN$ |
| Tetrabutylammonium iodide ≥99.0% (AT) | $C_{16}H_{36}IN$ |
| Tetrabutylammonium iodide reagent grade, 98% | $C_{16}H_{36}IN$ |
| Tetrabutylammonium methanesulfonate ≥97.0% (T) | $C_{17}H_{39}NO_3S$ |
| Tetrabutylammonium methoxide solution 20% in methanol (NT) | $C_{17}H_{39}NO$ |
| Tetrabutylammonium nitrate purum, ≥97.0% (NT) | $C_{16}H_{36}N_2O_3$ |
| Tetrabutylammonium nitrate 97% | $C_{16}H_{36}N_2O_3$ |
| Tetrabutylammonium nitrite ≥97.0% (NT) | $C_{16}H_{36}N_2O_2$ |
| Tetrabutylammonium nonafluorobutanesulfonate ≥98.0% | $C_{20}H_{36}F_9NO_3S$ |
| Tetrabutylammonium perchlorate for electrochemical analysis, ≥99.0% | $C_{16}H_{36}ClNO_4$ |
| Tetrabutylammonium perchlorate ≥98.0% (T) | $C_{16}H_{36}ClNO_4$ |
| Tetrabutylammonium phosphate monobasic puriss., ≥99.0% (T) | $C_{16}H_{38}NO_4P$ |
| Tetrabutylammonium phosphate monobasic solution 1.0M in $H_2O$ | $C_{16}H_{38}NO_4P$ |
| Tetrabutylammonium phosphate monobasic solution puriss., ~1M in $H_2O$ | $C_{16}H_{38}NO_4P$ |
| Tetrabutylammonium succinimide ≥97.0% (NT) | $C_{20}H_{40}N_2O_2$ |
| Tetrabutylammonium sulfate solution 50 wt. % in $H_2O$ | $C_{32}H_{72}N_2O_4S$ |
| Tetrabutylammonium tetrabutylborate 97% | $C_{32}H_{72}BN$ |
| Tetrabutylammonium tetrafluoroborate for electrochemical analysis, ≥99.0% | $C_{16}H_{36}BF_4N$ |
| Tetrabutylammonium tetrafluoroborate puriss., ≥99.0% (T) | $C_{16}H_{36}BF_4N$ |
| Tetrabutylammonium tetrafluoroborate 99% | $C_{16}H_{36}BF_4N$ |
| Tetrabutylammonium tetraphenylborate for electrochemical analysis, ≥99.0% | $C_{40}H_{56}BN$ |
| Tetrabutylammonium tetraphenylborate puriss., ≥99.0% (NT) | $C_{40}H_{56}BN$ |
| Tetrabutylammonium tetraphenylborate 99% | $C_{40}H_{56}BN$ |
| Tetrabutylammonium thiocyanate purum, ≥99.0% (AT) | $C_{17}H_{36}N_2S$ |
| Tetrabutylammonium thiocyanate 98% | $C_{17}H_{36}N_2S$ |
| Tetrabutylammonium p-toluenesulfonate purum, ≥99.0% (T) | $C_{23}H_{43}NO_3S$ |
| Tetrabutylammonium p-toluenesulfonate 99% | $C_{23}H_{43}NO_3S$ |
| Tetrabutylammonium tribromide purum, ≥98.0% (RT) | $C_{16}H_{36}BrN$ |
| Tetrabutylammonium tribromide 98% | $C_{16}H_{36}BrN$ |
| Tetrabutylammonium trifluoromethanesulfonate ≥99.0% (T) | $C_{17}H_{36}F_3NO_3S$ |
| Tetrabutylammonium triiodide ≥97.0% (AT) | $C_{16}H_{36}I_3N$ |
| Tetradodecylammonium bromide ≥99.0% (AT) | $C_{48}H_{100}BrN$ |
| Tetradodecylammonium chloride ≥97.0% (AT) | $C_{48}H_{100}ClN$ |
| Tetraethylammonium acetate tetrahydrate 99% | $C_{10}H_{23}NO_2 \cdot 4H_2O$ |
| Tetraethylammonium benzoate for electrochemical analysis, ≥99.0% | $C_{15}H_{25}NO_2$ |
| Tetraethylammonium bicarbonate ≥95.0% (T) | $C_9H_{21}NO_3$ |
| Tetraethylammonium bistrifluoromethanesulfonimidate for electronic purposes, ≥99.0% | $C_{10}H_{20}F_6N_2O_4S_2$ |
| Tetraethylammonium bromide ReagentPlus®, 99% | $C_8H_{20}BrN$ |
| Tetraethylammonium bromide reagent grade, 98% | $C_8H_{20}BrN$ |
| Tetraethylammonium chloride for electrochemical analysis, ≥99.0% | $C_8H_{20}ClN$ |
| Tetraethylammonium chloride hydrate | $C_8H_{20}ClN \cdot xH_2O$ |
| Tetraethylammonium chloride monohydrate ≥98.0% | $C_8H_{20}ClN \cdot H_2O$ |
| Tetraethylammonium cyanate technical | $C_9H_{20}N_2O$ |
| Tetraethylammonium cyanide punun, ≥95% (AT) | $C_9H_{20}N_2$ |
| Tetraethylammonium cyanide 94% | $C_9H_{20}N_2$ |
| Tetraethylammonium hexafluorophosphate for electrochemical analysis, ≥99.0% | $C_8H_{20}F_6NP$ |
| Tetraethylammonium hexafluorophosphate 99% | $C_8H_{20}F_6NP$ |
| Tetraethylammonium hydrogen sulfate ≥99.0% (T) | $C_8H_{21}NO_4S$ |
| Tetraethylammonium hydrogen sulfate ≥98.0% (T) | $C_8H_{21}NO_4S$ |
| Tetraethylammonium iodide puriss., ≥98.5% (CHN) | $C_8H_{20}IN$ |
| Tetraethylammonium iodide 98% | $C_8H_{20}IN$ |
| Tetraethylammonium nitrate ≥98.0% (NT) | $C_8H_{20}N_2O_3$ |
| Tetraethylammonium tetrafluoroborate for electrochemical analysis, ≥99.0% | $C_8H_{20}BF_4N$ |
| Tetraethylammonium tetrafluoroborate purum, ≥98.0% (T) | $C_8H_{20}BF_4N$ |
| Tetraethylammonium tetrafluoroborate 99% | $C_8H_{20}BF_4N$ |
| Tetraethylammonium p-toluenesulfonate 97% | $C_{15}H_{27}NO_3S$ |
| Tetraethylammonium trifluoromethanesulfonate ≥98.0% (T) | $C_9H_{20}F_3NO_3S$ |
| Tetraheptylammonium bromide ≥99.0% (AT) | $C_{28}H_{60}BrN$ |
| Tetraheptylammonium iodide ≥99.0% (AT) | $C_{28}H_{60}IN$ |
| Tetrahexadecylammonium bromide purum, ≥98.0% (NT) | $C_{64}H_{132}BrN$ |
| Tetrahexadecylammonium bromide 98% | $C_{64}H_{132}BrN$ |
| Tetrahexylammonium benzoate solution ~75% in methanol | $C_{31}H_{57}NO_2$ |
| Tetrahexylammonium bromide 99% | $C_{24}H_{52}BrN$ |
| Tetrahexylammonium chloride 96% | $C_{24}H_{52}ClN$ |
| Tetrahexylammonium hexafluorophosphate ≥97.0% (gravimetric) | $C_{24}H_{52}F_6NP$ |
| Tetrahexylammonium hydrogensulfate 98% | $C_{24}H_{53}NO_4S$ |

TABLE S2-continued

A list of surfactants which could be potentially used as an alternative to the current surfactants. Any derivative of the above compounds could also be potentially used.

| Surfactant Name | Molecular Formula |
| --- | --- |
| Tetrahexylammonium hydrogensulfate ≥98.0% (T) | $C_{24}H_{53}NO_4S$ |
| Tetrahexylammonium iodide ≥99.0% (AT) | $C_{24}H_{52}IN$ |
| Tetrahexylammonium tetrafluoroborate ≥97.0% | $C_{24}H_{52}BF_4N$ |
| Tetrakis(decyl)ammonium bromide ≥99% (titration) | $C_{40}H_{84}BrN$ |
| Tetrakis(decyl)ammonium bromide ≥99.0% (AT) | $C_{40}H_{84}BrN$ |
| Tetramethylammonium acetate technical grade, 90% | $C_6H_{15}NO_2$ |
| Tetramethylammonium benzoate electrochemical grade, ≥98.5% (NT) | $C_{11}H_{17}NO_2$ |
| Tetramethylammonium bis(trifluoromethanesulfonyl)imide 97% | $C_6H_{12}F_6N_2O_4S_2$ |
| Tetramethylammoniumbisulfate hydrate ≥98.0% (calc. on dry substance, T) | $C_4H_{13}NO_4S \cdot xH_2O$ |
| Tetramethylammonium bromide ACS reagent, ≥98.0% | $C_4H_{12}BrN$ |
| Tetramethylammonium bromide 98% | $C_4H_{12}BrN$ |
| Tetramethylammonium bromide for electrochemical analysis, ≥99.0% | $C_4H_{12}BrN$ |
| Tetramethylammonium chloride for electrochemical analysis, ≥99.0% | $C_4H_{12}ClN$ |
| Tetramethylammonium chloride purum, ≥98.0% (AT) | $C_4H_{12}ClN$ |
| Tetramethylammonium chloride reagent grade, ≥98% | $C_4H_{12}ClN$ |
| Tetramethylammonium chloride solution for molecular biology | |
| Tetramethylammonium formate solution 30 wt. % in $H_2O$, ≥99.99% trace metals basis | $C_5H_{13}NO_2$ |
| Tetramethylammonium hexafluorophosphate ≥98.0% (gravimetric) | $C_4H_{12}F_6NP$ |
| Tetramethylammonium hydrogen sulfate monohydrate crystallized, ≥98.0% (T) | $C_4H_{13}NO_4S \cdot H_2O$ |
| Tetramethylammonium hydrogensulfate hydrate 98% | $C_4H_{13}NO_4S \cdot xH_2O$ |
| Tetramethylammonium iodide 99% | $C_4H_{12}IN$ |
| Tetramethylammonium nitrate 96% | $C_4H_{12}N_2O_3$ |
| Tetramethylammonium silicate solution 15-20 wt. % in $H_2O$, ≥99.99% trace metals basis | $C_4H_{13}NO_5Si_2$ |
| Tetramethylammonium sulfate hydrate | $C_8H_{24}N_2O_4S \cdot xH_2O$ |
| Tetramethylammonium tetrafluoroborate purum, ≥98.0% (T) | $C_4H_{12}BF_4N$ |
| Tetramethylammonium tetrafluoroborate 97% | $C_4H_{12}BF_4N$ |
| Tetramethylammonium tribromide purum, ≥98.0% (AT) | $C_4H_{12}Br_3N$ |
| Tetraoctadecylammonium bromide purum, ≥98.0% (NT) | $C_{72}H_{148}BrN$ |
| Tetraoctadecylammonium bromide 98% | $C_{72}H_{148}BrN$ |
| Tetraoctylammonium bromide purum, ≥98.0% (AT) | $C_{32}H_{68}BrN$ |
| Tetraoctylammonium bromide 98% | $C_{32}H_{68}BrN$ |
| Tetraoctylammonium chloride ≥97.0% (AT) | $C_{32}H_{68}ClN$ |
| Tetrapentylammonium bromide ≥99% | $C_{20}H_{44}NBr$ |
| Tetrapentylammonium chloride 99% | $C_{20}H_{44}ClN$ |
| Tetrapropylammonium perchlorate ≥98.0% (T) | $C_{12}H_{28}ClNO_4$ |
| Tetrapropylammonium bromide for electrochemical analysis, ≥99.0% | $C_{12}H_{28}BrN$ |
| Tetrapropylammonium bromide purum, ≥98.0% (AT) | $C_{12}H_{28}BrN$ |
| Tetrapropylammonium bromide 98% | $C_{12}H_{28}BrN$ |
| Tetrapropylammonium chloride 98% | $C_{12}H_{28}ClN$ |
| Tetrapropylammonium iodide ≥98% | $C_{12}H_{28}IN$ |
| Tetrapropylammonium tetrafluoroborate ≥98.0% | $C_{12}H_{28}BF_4N$ |
| Tributylammonium pyrophosphate | |
| Tributylmethylammonium bromide ≥98.0% | $C_{13}H_{30}BrN$ |
| Tributylmethylammonium chloride ≥98.0% (T) | $C_{13}H_{30}ClN$ |
| Tributylmethylammonium chloride solution 75 wt. % in $H_2O$ | $C_{13}H_{30}ClN$ |
| Tributylmethylammonium methyl sulfate ≥95% | $C_{14}H_{33}NO_4S$ |
| Tricaprylylmethylammonium chloride mixture of $C_8$-$C_{10}$ $C_8$ is dominant | |
| Tridodecylmethylammonium chloride purum, ≥97.0% (AT) | $C_{37}H_{78}ClN$ |
| Tridodecylmethylammonium chloride 98% | $C_{37}H_{78}ClN$ |
| Tridodecylmethylammonium iodide 97% | $C_{37}H_{78}IN$ |
| Triethylhexylammonium bromide 99% | $C_{12}H_{28}BrN$ |
| Triethylmethylammonium bromide ≥99.0% | $C_7H_{18}BrN$ |
| Triethylmethylammonium chloride 97% | $C_7H_{18}ClN$ |
| Trihexyltetradecylammonium bromide ≥97.0% (T) | $C_{32}H_{68}BrN$ |
| Trimethyloctadecylammonium bromide purum, ≥97.0% (AT) | $C_{21}H_{46}BrN$ |
| Trimethyloctadecylammonium bromide 98% | $C_{21}H_{46}BrN$ |
| Trimethyloctylammonium bromide ≥98.0% (AT) | $C_{11}H_{26}BrN$ |
| Trimethyloctylammonium chloride ≥97.0% (AT) | $C_{11}H_{26}ClN$ |
| Trimethylphenylammonium bromide 98% | $C_9H_{14}BrN$ |
| Trimethylphenylammonium chloride ≥98% | $C_9H_{14}ClN$ |
| Trimethylphenylammonium tribromide 97% | $C_9H_{14}Br_3N$ |
| Trimethyl-tetradecylammonium chloride ≥98.0% (AT) | $C_{17}H_{38}ClN$ |
| (Vinylbenzyl)trimethylammonium chloride 99% | $C_{12}H_{18}ClN$ |
| N-(Allyloxycarbonyloxy)succinimide 96% | $C_8H_9NO_5$ |
| 3-Benzyl-5-(2-hydroxyethyl)-4-methylthiazolium chloride purum, ≥99.0% (AT) | $C_{13}H_{16}ClNOS$ |
| 3-Benzyl-5-(2-hydroxyethyl)-4-methylthiazolium chloride 98% | $C_{13}H_{16}ClNOS$ |
| 1-Butyl-2,3-dimethylimidazolium chloride ≥97.0% (HPLC/AT) | $C_9H_{17}ClN_2$ |
| 1-Butyl-2,3-dimethylimidazolium hexafluorophosphate | $C_9H_{17}F_6N_2P$ |
| 1-Butyl-2,3-dimethylimidazolium tetrafluoroborate ≥97.0% | $C_9H_{17}BF_4N_2$ |
| 1,3-Didecyl-2-methylimidazolium chloride 96% | $C_{24}H_{47}ClN_2$ |

TABLE S2-continued

A list of surfactants which could be potentially used as an alternative to the current surfactants. Any derivative of the above compounds could also be potentially used.

| Surfactant Name | Molecular Formula |
|---|---|
| 1,1-Dimethyl-4-phenylpiperazinium iodide ≥99.0% (AT) | $C_{12}H_{19}IN_2$ |
| 1-Ethyl-2,3-dimethylimidazolium ethyl sulfate BASF quality, ≥94.5% (HPLC) | $C_9H_{18}N_2O_4S$ |
| 3-Ethyl-5-(2-hydroxyethyl)-4-methylthiazolium bromide ≥98% | $C_8H_{14}BrNOS$ |
| Hexadecylpyridinium bromide | $C_{21}H_{38}BrN$ |
| Hexadecylpyridinium bromide ≥97.0% | $C_{21}H_{38}BrN$ |
| Hexadecylpyridinium chloride monohydrate BioXtra, 99.0-102.0% | $C_{21}H_{38}ClN \cdot H_2O$ |
| 5-(2-Hydroxyethyl)-3,4-dimethylthiazolium iodide 98% | $C_7H_{12}INOS$ |
| 1-Methylimidazolium hydrogen sulfate 95% | $C_4H_6N_2 \cdot H_2SO_4$ |
| Methyl viologen dichloride hydrate 98% | $C_{12}H_{14}Cl_2N_2 \cdot xH_2O$ |
| 1,2,3-Trimethylimidazolium methyl sulfate BASF quality, 95% | $C_7H_{14}N_2O_4S$ |
| DL-α-Tocopherol methoxypolyethylene glycol succinate | |
| DL-α-Tocopherol methoxypolyethylene glycol succinate solution 2 wt. % in $H_2O$ | |
| DL-α-Tocopherol methoxypolyethylene glycol succinate solution 5 wt. % in $H_2O$ | |
| Aliquat ® HTA-1 High-Temperature Phase Transfer Catalyst, 30-35% in $H_2O$ | |
| Bis[tetrakis(hydroxymethyl)phosphonium] sulfate solution technical, 70-75% in $H_2O$ (T) | $C_8H_{24}O_{12}P_2S$ |
| Dimethyldiphenylphosphonium iodide purum, ≥98.0% (AT) | $C_{14}H_{16}IP$ |
| Dimethyldiphenylphosphonium iodide 98% | $C_{14}H_{16}IP$ |
| Methyltriphenoxyphosphonium iodide 96% | $C_{19}H_{18}IO_3P$ |
| Methyltriphenoxyphosphonium iodide technical, ≥96.0% (AT) | $C_{19}H_{18}IO_3P$ |
| Tetrabutylphosphonium bromide 98% | $C_{16}H_{36}BrP$ |
| Tetrabutylphosphonium chloride 96% | $C_{16}H_{36}ClP$ |
| Tetrabutylphosphonium hexafluorophosphate for electrochemical analysis, ≥99.0% | $C_{16}H_{36}F_6P_2$ |
| Tetrabutylphosphonium methanesulfonate ≥98.0% (NT) | $C_{17}H_{39}O_3PS$ |
| Tetrabutylphosphonium tetrafluoroborate for electrochemical analysis, ≥99.0% | $C_{16}H_{36}BF_4P$ |
| Tetrabutylphosphonium p-toluenesulfonate ≥95% (NT) | $C_{23}H_{43}O_3PS$ |
| Tetrakis(hydroxymethyl)phosphonium chloride solution 80% in $H_2O$ | $C_4H_{12}ClO_4P$ |
| Tetrakis(hydroxymethyl)phosphonium chloride solution technical, ~80% in $H_2O$ | $C_4H_{12}ClO_4P$ |
| Tetrakis[tris(dimethylamino)phosphoranylidenamino]phosphonium chloride ≥98.0% | $C_{24}H_{72}ClN_{16}P_5$ |
| Tetramethylphosphonium bromide 98% | $C_4H_{12}BrP$ |
| Tetramethylphosphonium chloride 98% | $C_4H_{14}ClP$ |
| Tetraphenylphosphonium bromide 97% | $C_{24}H_{20}BrP$ |
| Tetraphenylphosphonium chloride for the spectrophotometric det. of Bi, Co, ≥97.0% | $C_{24}H_{20}ClP$ |
| Tetraphenylphosphonium chloride 98% | $C_{24}H_{20}ClP$ |
| Tributylhexadecylphosphonium bromide 97% | $C_{28}H_{60}BrP$ |
| Trihexyltetradecylphosphonium bis(2,4,4-trimethylpentyl)phosphinate ≥95.0% | $C_{48}H_{102}O_2P_2$ |
| Trihexyltetradecylphosphonium bromide ≥95% | $C_{32}H_{68}BrP$ |
| Trihexyltetradecylphosphonium chloride ≥95.0% (NMR) | $C_{32}H_{68}ClP$ |
| Trihexyltetradecylphosphonium dicyanamide ≥95% | $C_{34}H_{68}N_3P$ |
| ALKANOL ® 6112 surfactant | |
| Adogen ® 464 | |
| Brij ® 52 main component: diethylene glycol hexadecyl ether | |
| Brij ® 52 average $M_n$ ~330 | |
| Brij ® 93 average $M_n$ ~357 | |
| Brij ® S2 main component: diethylene glycol octadecyl ether | |
| Brij ® S 100 average $M_n$ ~4,670 | |
| Brij ® 58 average $M_n$ ~1124 | |
| Brij ® C10 average $M_n$ ~683 | |
| Brij ® L4 average $M_n$ ~362 | |
| Brij ® O10 average $M_n$ ~709 | |
| BRIJ ® O20 average $M_n$ ~1,150 | |
| Brij ® S10 average $M_n$ ~711 | |
| Brij ® S20 | |
| Ethylenediamine tetrakis(ethoxylate-block-propoxylate) tetrol average $M_n$ ~7,200 | |
| Ethylenediamine tetrakis(ethoxylate-block-propoxylate) tetrol average $M_n$ ~8,000 | |
| Ethylenediamine tetrakis(propoxylate-block-ethoxylate) tetrol average $M_n$ ~3,600 | |
| IGEPAL ® CA-520 average $M_n$ ~427 | |
| IGEPAL ® CA-720 average $M_n$ ~735 | |
| IGEPAL ® CO-520 average $M_n$ 441 | |
| IGEPAL ® CO-630 average $M_n$ 617 | |
| IGEPAL ® CO-720 average $M_n$ ~749 | |

TABLE S2-continued

A list of surfactants which could be potentially used as an alternative to the current surfactants. Any derivative of the above compounds could also be potentially used.

| Surfactant Name | Molecular Formula |
|---|---|
| IGEPAL ® CO-890 average $M_n$ ~1,982 | |
| IGEPAL ® DM-970 | |
| MERPOL ® DA surfactant 60 wt. % in water: isobutanol (ca. 50:50) | |
| MERPOL ® HCS surfactant | |
| MERPOL ® OJ surfactant | |
| MERPOL ® SE surfactant | |
| MERPOL ® SH surfactant | |
| MERPOL ® A surfactant | |
| Poly(ethylene glycol) sorbitan tetraoleate | |
| Poly(ethylene glycol) sorbitol hexaoleate | |
| Poly(ethylene glycol) (12) tridecyl ether mixture of $C_{11}$ to $C_{14}$ iso-alkyl ethers with $C_{13}$ iso-alkyl predominating | |
| Poly(ethylene glycol) (18) tridecyl ether mixture of $C_{11}$ to $C_{14}$ iso-alkyl ethers with $C_{13}$ iso-alkyl predominating | |
| Polyethylene-block-poly(ethylene glycol) average $M_n$ ~575 | |
| Polyethylene-block-poly(ethylene glycol) average $M_n$ ~875 | |
| Polyethylene-block-poly(ethylene glycol) average $M_n$ ~920 | |
| Polyethylene-block-poly(ethylene glycol) average $M_n$ ~1,400 | |
| Sorbitan monopalmitate | |
| 2,4,7,9-Tetramethyl-5-decyne-4,7-diol ethoxylate average $M_n$ 670 | |
| 2,4,7,9-Tetramethyl-5-decyne-4,7-diol, mixture of (±) and meso 98% | |
| Triton ™ N-101, reduced | |
| Triton ™ X-100 | |
| Triton ™ X-100 reduced | |
| Triton ™ X-114, reduced, ≥99% | |
| Triton ™ X-114, reduced | |
| Triton ™ X-405, reduced | |
| TWEEN ® 20 average $M_n$ ~1,228 | |
| TWEEN ® 40 viscous liquid | |
| TWEEN ® 60 nonionic detergent | |
| TWEEN ® 85 | |

Reference throughout this specification to "an embodiment," "some embodiments," or "one embodiment." means that a particular feature, structure, material, or characteristic described in connection with the embodiment is included in at least one embodiment of the present disclosure. Thus, the appearances of the phrases such as "in some embodiments," "in one embodiment," or "in an embodiment," in various places throughout this specification are not necessarily referring to the same embodiment of the present disclosure. Furthermore, the particular features, structures, materials, or characteristics may be combined in any suitable manner in one or more embodiments.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A composition of matter comprising a hydrogel including a metallic salt, a cationic surfactant, ascorbic acid, agarose, and water.

2. The composition of claim 1, wherein the metallic salt comprises a gold salt.

3. The composition of claim 1, wherein the metallic salt comprises a salt of auric chloride ($HAuCl_4$).

4. The composition of claim 1, wherein the cationic surfactant comprises cetyl trimethammoniom bromide ($C_{16}TAB$).

5. The composition of claim 1, wherein the ascorbic acid comprises L-ascorbic acid.

6. An apparatus comprising:
a substantially colorless hydrogel to receive a low dose of radiation and form a radiated hydrogel having a color; and
a detector optically coupled to the radiated hydrogel, wherein the radiated hydrogel comprises a plasmonic nanoparticle.

7. An apparatus comprising:
a substantially colorless hydrogel to receive a low dose of radiation and form a radiated hydrogel having a color; and
a detector optically coupled to the radiated hydrogel, wherein the substantially colorless hydrogel comprises a metallic salt, a cationic surfactant, ascorbic acid, agarose, and water.

8. The apparatus of claim 7, wherein the metallic salt comprises a gold salt.

9. The apparatus of claim 7, wherein the metallic salt comprises a salt of auric chloride ($HAuCl_4$).

10. The apparatus of claim 7, wherein the cationic surfactant comprises cetyl trimethammoniom bromide ($C_{16}TAB$).

11. The apparatus of claim 7, wherein the ascorbic acid comprises L-ascorbic acid.

* * * * *